(12) United States Patent
Shen

(10) Patent No.: US 12,725,942 B2
(45) Date of Patent: Sep. 1, 2026

(54) MULTIBEAM ARRAY ANTENNAS WITH STABLE BEAM PEAKS AND BEAM WIDTHS THROUGH MULTIPLEXERS

(71) Applicant: Communication Components Antenna Inc., Kanata (CA)

(72) Inventor: Lin-Ping Shen, Ontario (CA)

(73) Assignee: COMMUNICATION COMPONENTS ANTENNA INC., Kanata (CA)

( * ) Notice: Subject to any disclaimer, the term of this patent is extended or adjusted under 35 U.S.C. 154(b) by 94 days.

(21) Appl. No.: 18/916,355

(22) Filed: Oct. 15, 2024

(65) Prior Publication Data

US 2026/0106384 A1 Apr. 16, 2026

(51) Int. Cl.

| | |
|---|---|
| ***H01Q 25/00*** | (2006.01) |
| ***H01Q 21/06*** | (2006.01) |
| *H01Q 21/30* | (2006.01) |
| *H04B 7/0413* | (2017.01) |

(52) U.S. Cl.

CPC ......... *H01Q 25/008* (2013.01); *H01Q 21/061* (2013.01); *H01Q 21/30* (2013.01); *H04B 7/0413* (2013.01)

(58) Field of Classification Search

CPC .... H01Q 21/061; H01Q 21/30; H01Q 25/008; H04B 7/0413

See application file for complete search history.

(56) References Cited

U.S. PATENT DOCUMENTS

| | | | | |
|---|---|---|---|---|
| 2020/0044345 | A1* | 2/2020 | Zimmerman | H04W 16/28 |
| 2020/0358182 | A1* | 11/2020 | Klemmer | H01Q 3/26 |
| 2024/0313422 | A1* | 9/2024 | Hojat | H01Q 1/246 |

* cited by examiner

*Primary Examiner* — Daniel Munoz

(74) *Attorney, Agent, or Firm* — Sofer & Haroun, LLP

(57) ABSTRACT

A multibeam antenna operating over a plurality of frequency bands includes a plurality of planar multibeam arrays, each array corresponding to an operating frequency band $\Delta F_i$ within the plurality of the frequency bands. Each array has a plurality of antenna elements for transmitting and receiving signals where distances between the antenna elements on each of the arrays is arranged as a function of a center frequency $f_i$ of the operating frequency band. The multibeam antenna has a plurality of multiplexers, each coupled to plurality of planar multibeam arrays, each of the multiplexers having a common beam port for sending and receiving the signals through the antenna elements.

14 Claims, 20 Drawing Sheets

MULTIBEAM ARRAY ANTENNAS WITH STABLE BEAM PEAKS AND BEAM WIDTHS THROUGH MULTIPLEXERS

FIELD OF THE INVENTION

This invention relates to base station antennas. More particularly, the present arrangement relates to a multibeam base station antenna with stable beam peaks and stable beam widths across multiple operating frequency bands.

DESCRIPTION OF RELATED ART

In the field of cellular communications and infrastructure, base station antennas are the array antennas that can control the transmitting/receiving radio signals in a specific direction. In typical cellular wireless communications, there are three sectors of 120 degrees to cover the cellular aera and each sector is covered by a traditional single beam base station antenna with 65-degree 3 dB beamwidth. The main lobe of the radiation pattern has a 65-degree beamwidth within which the signal strength remains within 3 dB or half of the peak power. Normally, a remote control electrical down tilt (RET) capability is required for the base station for better coverage in the macro applications.

To increase the spectral efficiency (or communication capacity), numerous sectors are introduced through multibeam antennas, such as for example, two-beam antennas with 33-degree 3 dB beamwidth, three-beam antennas with 22-degree 3 dB beamwidth, six-beam antennas with 10-degree 3 dB beamwidth, and ten-beam antenna with 5-degree 3 dB beamwidth. There are two types of multibeam antennas available in the market: (1) panel-based multibeam antennas; and (2) lens-based multibeam antennas. Due to the compact size and low cost, panel-based multibeam antennas with fixed electrical down tilt (FET) capability are widely used in special event applications such as outdoor concerts and sport stadiums.

The panel-based multibeam antennas consists of one or two wideband dual polarization antenna arrays to realize the multibeam applications through what is known as the circuit-type beamforming networks (BFN), such as for example, a single array for 2×2 MIMO applications and double arrays for 4×4 MIMO applications. In each array, there are number of columns and number of rows of antenna elements to realize the required pattern specifications.

Normally, there are two kinds of beamforming networks (BFNs) used in the panel-based multibeam arrays: Azimuth BFN (AZBFN) and elevation BFN (ELBFN), in which AZBFN controls the azimuth beam patterns and ELBFN controls the elevation beam patterns. In fixed electrical down tilt (FET) applications, in order to reduce the amount of cable connections in the antenna, dual polarized ELBFNs employing T-splitter power dividers, are integrated with the antenna element feeding network and two AZBFNs, each for a corresponding polarization, are connected with ELBFN through the cable connections.

On the other hand, for the remote electrical tilt (RET) applications, AZBFNs need to be integrated with the antenna element feeding network and dual polarized ELBFNs employing phase shifters are connected with AZBFN through the cable connections. Since the complicated AZBFNs for high number of beams are very difficult to integrate with the antenna feeding network, the number of beams for such remote electrical tilt (RET) applications is typically limited to 2 beams or 3 beams.

Typical pattern specifications for multibeam antennas are gain, azimuth beam width (AZBW), elevation beamwidth (ELBW), cross-polarization discrimination (XPD), elevation, azimuth beam peak, and azimuth beam cross-over (X-over). The beam peak corresponds to the direction of maximum antenna gain, meaning the antenna is most efficient at transmitting or receiving signals in this direction.

Azimuth beam cross over refers to the region where the main lobes of adjacent beams intersect or overlap. The azimuth beam cross-over indicates the relative power level at the crossover point between two neighboring beams compared to the peak power of the beams, and typical X-over for both special event and macro applications is 10 dB.

Including in the well-known specifications for base station antennas, the azimuth beam peak (AZBP), the azimuth beam width (AZBW), and azimuth beam cross-over (X-over) are important parameters for multibeam antennas. The desired characteristics for these parameters are substantially fixed and stable AZBP and AZBW, which leads to a stable azimuth X-over. It is worth mentioning that the azimuth X-over is mainly determined by the number of array columns and the architecture of related ABFNs, with higher number of columns producing better results.

For example, in a six-beam antenna array with an 8×8 Butler matrix, the azimuth X-over is 10 dB for an array with 14 columns, 8 dB for an array with 12 column, and 4 dB for an array with 8 columns. The higher dB indicates that the power level at the crossover point between adjacent beams is lower than the peak power lever of the beams. Therefore, a 10 dB crossover indicates less overlap and more distinct separation between the beams compared to a 4 dB crossover.

FIG. 1A illustrates a prior art antenna arrangement, employing a Butler matrix-based six beam multibeam antenna with 6 rows and 14 columns, as described in more detail in the U.S. Pat. No. 10,461,438B2, and incorporated herein by reference.

To this end, FIG. 1A is the plan view of the Butler matrix-based single array six beam antenna working at the wideband of 1695-2690 MHz, in which the column number of the array is fourteen (14) and the row number is six (6) as described in more detail in FIG. 5 of the U.S. patent Ser. No. 10/461,438B2, incorporated herein by reference. Due to the wideband application, the beam peak and beam width of individual beams of multibeam applications changes with frequency.

FIG. 1B illustrates the measured azimuth patterns of the Butler matrix-based six beam antenna at the center frequency points of three sub-bands (i.e. 1740 MHz, 1930 MHz, and 2110 MHz) for the antenna illustrated in FIG. 1A. As shown, the beam peak angles of two edge beams are reduced to 28 degrees at 2.69 GHz from 47 degrees at 1.698 GHz, and the corresponding beamwidths, are reduced to 7 degrees at 2.69 GHz from 14 degrees at 1.698 GHz. This dispersive effect is mainly caused by the constant phase difference (a) between the signals fed to the neighboring antenna elements of the circuit-type BFN. For example, the constant phase differences ($\alpha$) are ±22.5°, ±67.5°, ±112.5° for the six beams AZBFN based on 8×8 Butler matrix of the antenna illustrated in FIG. 1A.

In order to explain the dispersive effect further, the reference is made to FIG. 2A illustrating the panel-based wideband multibeam beam array located at the XY plane, where there are C columns along the X direction, and R rows along the Y direction. Generally, the beam peak direction angle $\phi$ in the XZ plane (i. e., the azimuth plane) of the panel-based multibeam array are determined by, $$(2\pi/\lambda)\ d\ \sin(\phi) = \alpha \tag{1}$$

where λ is the operating wavelength, and d is the azimuth spacing between the antenna elements of the array along the azimuth X direction. Since the phase difference (α) fed to the neighboring antenna elements for the circuit-based azimuth beam forming networks (ABFNs) is constant, the azimuth beam peak ϕ will be decreased when the operating wavelength λ is reduced.

In order to have the same beam peak over the entire operating band, instead of only a constant value over each of the operating frequency bands, the phase difference α of the circuit-type AZBFNs preferably has a linear relationship with the operating frequency, which is inversely proportional to the wavelength λ, $$\alpha = \alpha_0 f = a_0 c/\lambda \tag{2}$$

where f=c/λ, f is the operating frequency, c is the speed of light, and $\alpha_0$ is the constant coefficient.

FIG. 1C illustrates a prior art, 6-input, 12-output Blass matrix-based beam forming network for a six beam multibeam antenna as described in more detail in US Patent publication 20230307832A1 and incorporated herein by reference. The Blass matrix is designed to distribute the input signals to various antenna elements in such a way that each output beam has a specific phase and amplitude distribution, allowing for precise control over the direction of each beam. By designing the Blass matrix-based AZBFNs carefully, a phase compensated six beam ABFN having a linear relationship with frequency of the phase difference is disclosed for an array with 12 columns. However, due to the matching loads, it is well known that the Blass matrix-based BFN is lossy, especially for antennas with small number of beams (i.e., 2-beam, 3-beam, and 4 beam).

On the other hand, in another prior art arrangement, in order to design a lossless azimuth beam forming network (ABFN) with a linear relationship with wavelength, United States Patent publication US20230170944A1, incorporated herein by reference, employs a Butler matrix-based six beam multibeam antenna for a 2×2 MIMO. Unlike the Blass matrix, due to the lossless nature of the Butler matrix, the phase of Butler-based ABFN could be compensated only for half set of beams. In other words, two antenna arrays are required to compensate full set of beams. FIG. 1D shows the schematic plan view of the six-beam antenna with 16 columns, in which BFN 140-1 and BFN 140-3 cover half of the beams at the first 8 column array, and BFN 140-2 and BFN 140-4 cover another half of the beams at the second 8 column array.

Overall, due to the fact that the phase difference α of AZBFN meets the equation (2) for two prior art arrangements described in FIG. 1C and FIG. 1D, equation (1) can be simplified as, $$(2\pi)\ d\ \sin(\phi) = \alpha_0 c \tag{3}$$

where the azimuth beam peak ϕ will be unchanged since the azimuth spacing d and the speed of light c are constant data. In theory, both phase compensation approaches mentioned in FIG. 1C and FIG. 1D solve the azimuth beam peak problem. As shown in FIG. 1E, the azimuth beam peaks are same for three center frequency points of three sub-bands (i.e., 1740 MHz, 1930 MHz, and 2110 MHz).

Objects and Summary

As discussed, the azimuth beam peaks of the multibeam arrays are fixed for the prior art arrangements described in FIG. 1C and FIG. 1D. However, due to the fact that the azimuth beamwidth is changing with the operating frequency, the azimuth X-over is changing over the frequency range as well.

For example, for the 14-column antenna array derived by the phase-compensated 8×8 Butler matrix, as shown in FIG. 1E, the beam X-over is 6 dB at 1740 MHz and 18 dB at 2590 MHz, respectively.

Also, due to larger electric azimuth spacing (i.e., d/A) at the high end of the frequency band, the azimuth grating lobe will appear as shown in FIG. 1E. Furthermore, like the azimuth beamwidth, the elevation beamwidth of the prior art arrays decreases with the increase of the frequency.

In summary, prior art arrangements disclose a way to keep the azimuth beam peak at a substantially fixed direction over the entire operating frequency band, but have failed to solve the problem of the azimuth beamwidth (i.e., the azimuth X-over) and elevation beamwidth change over the entire operation frequency band. Because there is a fixed physical spacing between antenna elements, these are some of the issues that remain unsolved by prior art antenna arrangements, some of which include:

1. A small azimuth electric spacing (d/λ, i.e., the physical spacing/wavelength) at low end of the frequency band causes small azimuth beam cross-over levels, leading to worse separation between the beams and more interference between the beams, and as such degrading the spectral efficiency.
2. The larger azimuth electric spacing (d/λ, i.e., the physical spacing/wavelength) at high end of the frequency band causes large azimuth beam cross-over levels, leading to wider separation between the beams, reducing the coverage area.
3. The larger elevation electric spacing (d/λ, i.e., the physical spacing/wavelength) at high end of the frequency band cause less elevation beam width, reducing the coverage area.
4. The larger electric spacing (d/λ, i.e., the physical spacing/wavelength) at high end of the frequency band, causes the grating lobe at both azimuth and elevation patterns, which in turn causes unwanted secondary peaks in the radiation pattern, degrading the communication performance.

Therefore, for high quality wireless communications such as carrier aggregation (CA), there is a need to maintain not only a substantially fixed beam directions over the entire operating frequency bands, but also fixed azimuth and elevation beam widths over those frequency bands.

The present embodiments as described hereinafter, operates substantially based on the arrangement described in reference to FIG. 2B, disclosing a general arrangement that accommodates the above requirements through the antenna array multiplexing. Instead of a single array mentioned in FIG. 1C or double arrays mentioned in FIG. 1D over the entire frequency band, the arrangement shown in FIG. 2B, employs a desired number of L arrays operating in different narrow operating bands $\Delta F_1$, $\Delta F_2$, . . . , $\Delta F_L$. The azimuth spacing $d_i$ between the antenna elements in each narrow array is designed for each array i to dynamically vary based on the corresponding operating wavelength $\lambda_i$, where i=1, 2, . . . , L:

$$d_i = C\lambda_i, \text{ where } i = 1, 2, \ldots , L \quad (4)$$

where C is the constant value, and $\lambda_i = c/f_i$, $f_i$ (i=1, 2, . . . , L) is the center frequency point of the corresponding operating frequency band $\Delta F_i$.

By inserting equation (4) into equation (1), the beam peak equation (1) can be simplified $$(2\pi)\ C\ \sin(\phi) = \alpha \quad (5)$$

So that a substantially constant beam peak direction angles $\phi$ of the panel-based multibeam arrays can be realized by the constant phase difference ($\alpha$) of the original circuit-type AZBFN over the entire operating frequency bands.

The present arrangement looks to overcome the drawbacks associated with the prior art and provide a combination of multiband subarrays through multiplexing to achieve the constant beam peak directions (or positions), the constant azimuth beam widths, and constant elevation beam widths over the entire frequency band.

To this end a multibeam base station antenna includes a plurality of multibeam sub-arrays and at least one kind of multiplexing component such as diplexers, triplexers, or quadplexers, and other kinds of multiplexers as deemed necessary based on the number of operating frequency bands and other design considerations in accordance with present invention.

The plurality of patch or dipole sub-arrays are arranged on a planar array of said antenna into a plurality of rows and columns of patch or dipole antenna elements through different arrangements such as stacked vertically, side-by-side, and interleaved each other.

FIG. 2B shows the block diagram of a 2×2 MIMO wideband multibeam antenna with substantially stable beam peaks and beam widths achieved by employing the multiplexing scheme described in various embodiments of the present invention. For simplicity, only one polarization is shown. By considering the dual polarization application, there are 2M beam ports for 2×2 MIMO antenna and 4M beam ports for 4×4 MIMO antenna. The beam ports m (m=1, 2, . . . , M) of multibeam arrays i (i=1, 2, . . . , L) is connected to the multiplexing components m (m=1, 2, . . . , M) to form a plurality of signal input ports of the multibeam antenna. Number L of the multibeam arrays is determined by the required frequency sub bands. For example, for the 6 beam multibeam array (i.e., M=6) over the frequency band of 1695-2400 MHz, three frequency sub bands (i.e., L=3) are required: $\Delta F_1$=1695-1780 MHz, $\Delta F_2$=1850-1995 MHz, and $\Delta F_3$=2110-2360 MHz, and the multiplexers for L=3 are the triplexers. In summary, after multiplexing several narrow band multibeam arrays, due to the dynamical changes of the azimuth and elevation spacings in each array i, the realized multibeam antennas have the fixed AZ/EL beam peaks and stable AZ/EL beam widths, across all the operating frequencies of the antenna.

BRIEF DESCRIPTION OF THE DRAWINGS

The present invention can be best understood through the following description and accompanying drawing, wherein.

DETAILED DESCRIPTION

The present arrangement as described in more detail below provides a new approach applied to the multibeam base station antennas using an arrangement for multiplexing several sub-band arrays to achieve constant beam peaks, constant azimuth beam widths, and constant elevation beam widths over the operating frequency band. In other words, by using the antenna array multiplexing approach in accordance with various exemplary embodiments of the invention as described herein, variation tolerances as required by system specifications to related pattern parameters (azimuth beam peak, azimuth beam width, and elevation beamwidth) are met and no additional prior art beam forming network (BFN) phase compensation is needed. For each operating frequency, a corresponding sub-array is designed with antenna elements separated in accordance with equation 4 above, so that the beam peak and beam width of the antenna beam patterns remain substantially the same across all operating frequency bands.

Figure 2A:
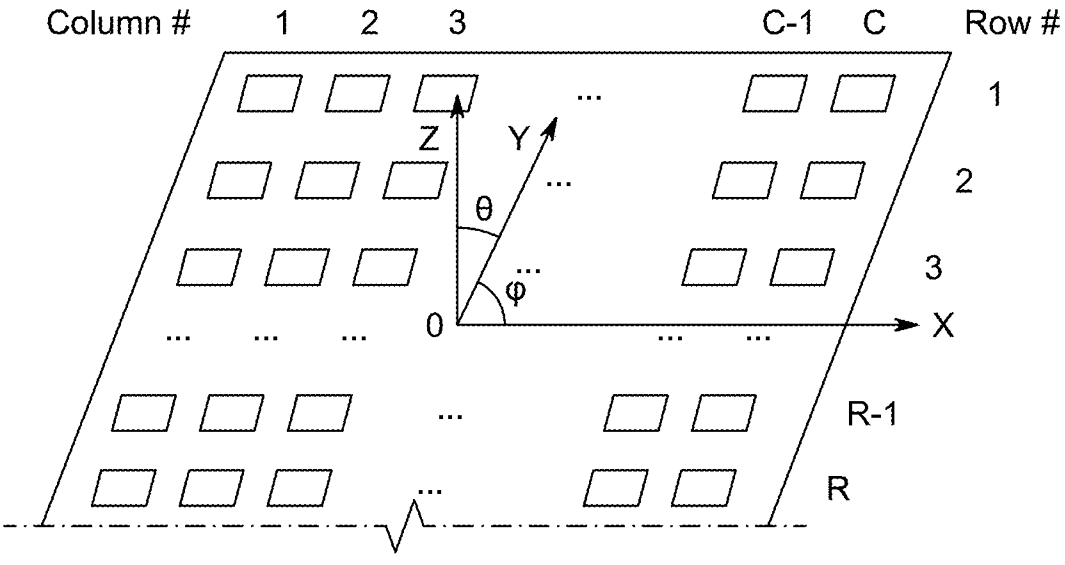
FIG. 2A, illustrates the three-dimensional (3D) coordinate system of an exemplary planar wideband multibeam beam array with a specified number of columns C and a specified number of rows R.
Figure 2B:
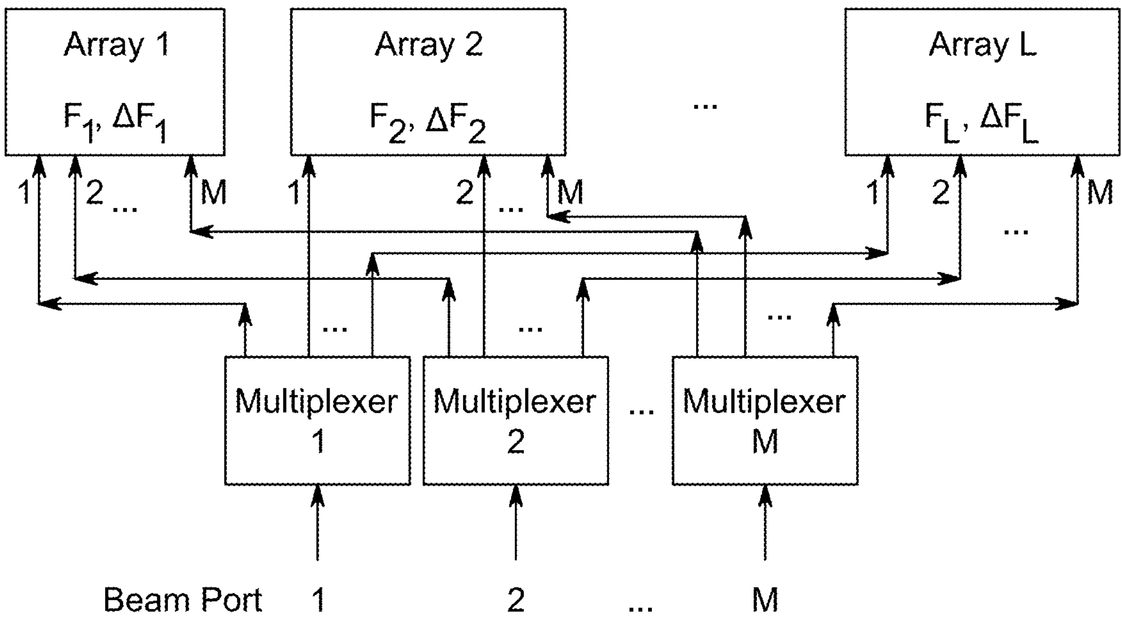
FIG. 2B, illustrates the block diagram of a 2×2 MIMO wideband multibeam beam antenna with stable beam peaks and stable beam widths by employing a multiplexing scheme in accordance with one embodiment of the present invention.
Figure 3B:
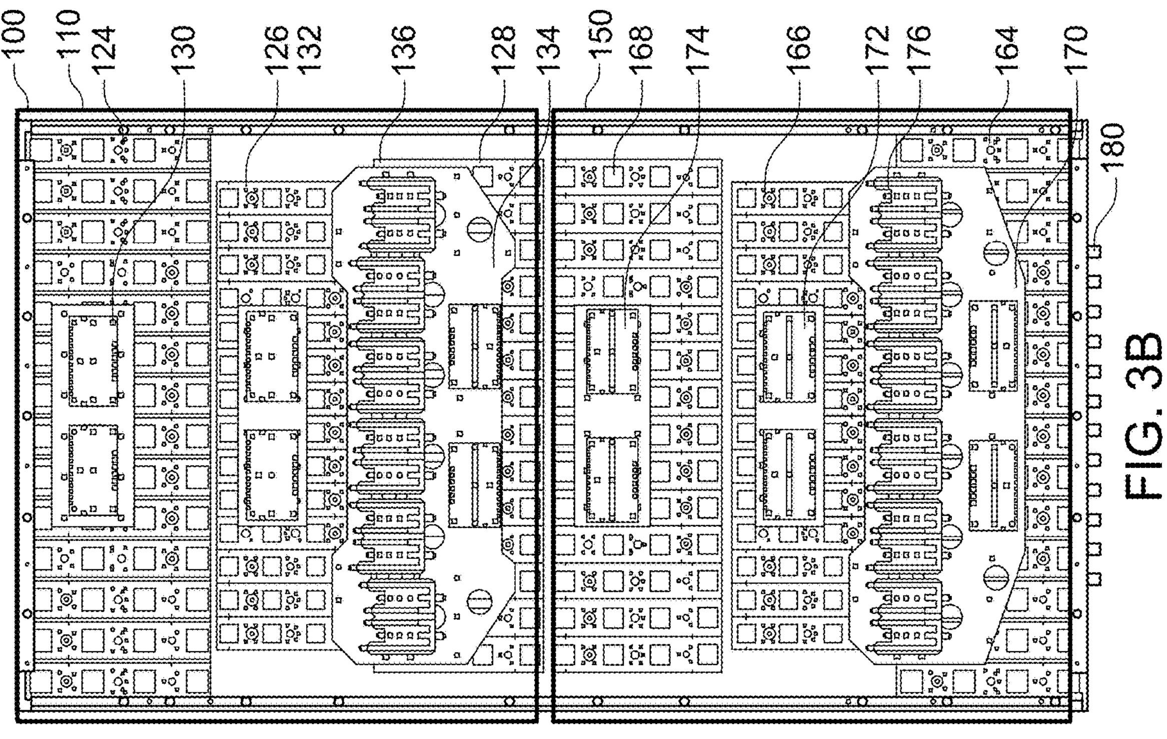
FIG. 3B illustrates the bottom view of the 4×4 MIMO six beam antenna with three operating sub-bands of FIG. 3A in accordance with one embodiment of the present invention.
Figure 3A:
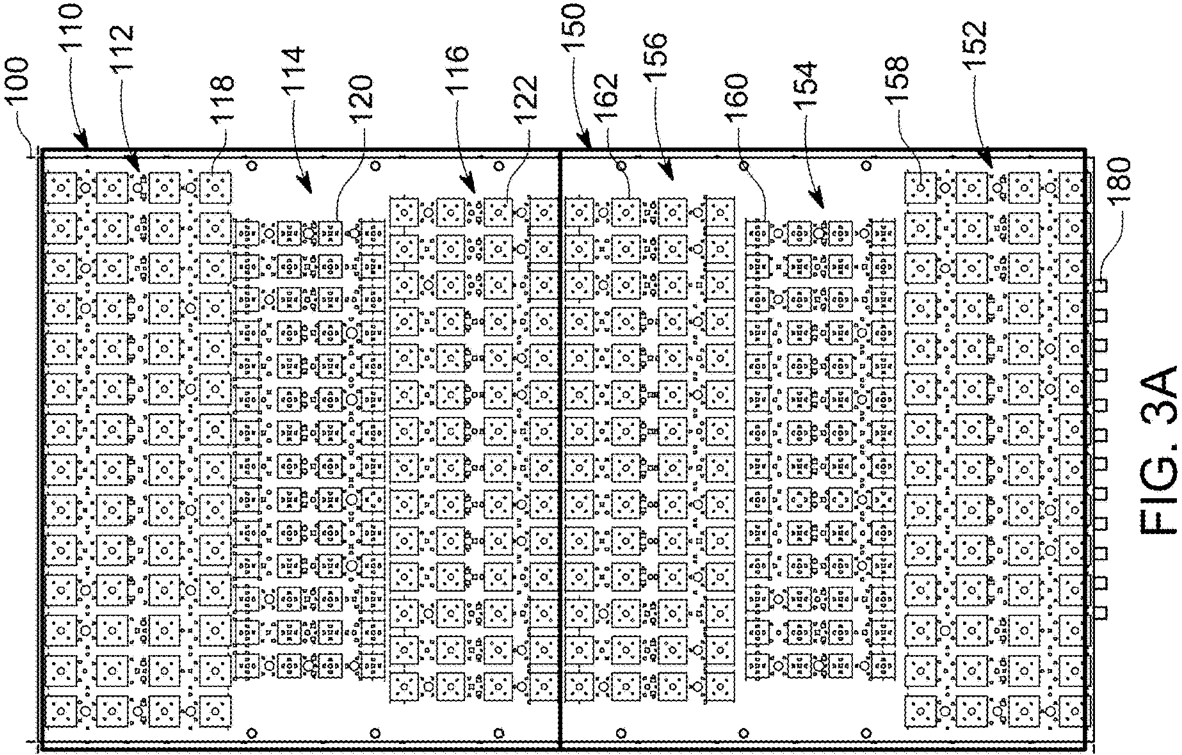
FIG. 3A illustrates the front view of a 4×4 MIMO six beam antenna with three operating sub-bands according to one embodiment of the present invention.

In accordance with one embodiment, FIGS. 3A-3B show a six-beam base station antenna 100 for a middle band application (i.e., 1.69-2.4 GHz) with three sub-bands. FIG. 3A is a front view of a 24 port antenna wherein FIGS. 3A and 3B show only 12 ports where the second 12 ports row for −45° is located behind the first 12 port row resulting in a dual-polarized 4×4 MIMO six-beam antenna 100 with six sub arrays 112, 114, 116, 152, 154, and 156. Three sub arrays 112, 114, 116 form the top half 110 of the six-beam antenna and three sub arrays 152, 154, 156 form the bottom half 150 of the six-beam antenna, with each half forming a 2×2 MIMO section Two 2×2 MIMO sections 110 and 150 are stacked vertically for a 4×4 MIMO application. For the sub arrays 112, 114, 116, 152, 154, and 156, there are fourteen columns and 4 rows for realizing high gain six-beam, in which sub arrays 112 and 152 covers AWS UL (Advanced Wireless Services Uplink) band (1695-1780 MHz, i.e., $\Delta F_1$), sub arrays 114 and 154 covers PCS (Personal Communications Services) band (1850-1995 MHz i.e., $\Delta F_2$), and sub arrays 116 and 156 covers AWS DL & WCS (Wireless Communications Services) band (2110-2360 MHz i.e., $\Delta F_3$). In each subarray 112, 114, 116, 152, 154, and 156, fifty-six patch elements 118, 120, 122, 158, 160, 168 are arranged uniformly with fourteen columns and four rows. Based on the definition of FIG. 2B, for this embodiment, the antenna architecture with M=6 beams, L=3 arrays, C=14 columns, R=4 rows, and quantity 24 triplexers is used in the 4×4 MIMO 6 beam multibeam antenna.

FIG. 3B is a bottom view of the 24 port, dual-polarized 4×4 MIMO six-beam antenna 100 with two 2×2 MIMO section 110 and 150, in which there are three sub-arrays, each sub array having two sets of ABFNs corresponding to two polarizations 112, 114, 116, 152, 154, and 156.

Figure 1A:
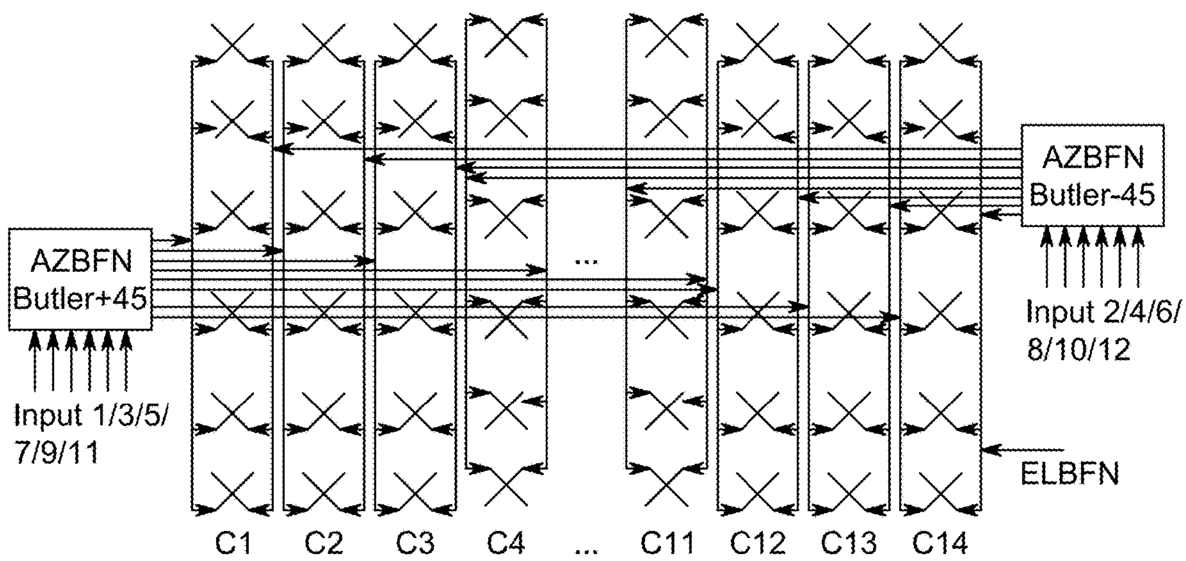
FIG. 1A, illustrates a prior art antenna system employing a Butler matrix-based six beam multibeam antenna (6 Rows and 14 columns).
Figure 1B:
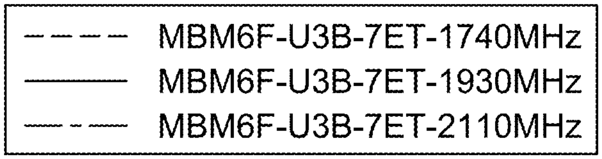
FIG. 1B, illustrates beam patterns of a prior art antenna system, showing the measured azimuth patterns of the Butler matrix-based six beam multibeam antenna at the center frequency points of three sub-bands (i.e., 1740 MHz, 1930 MHz, and 2110 MHz) of FIG. 1A.
Figure 1B:
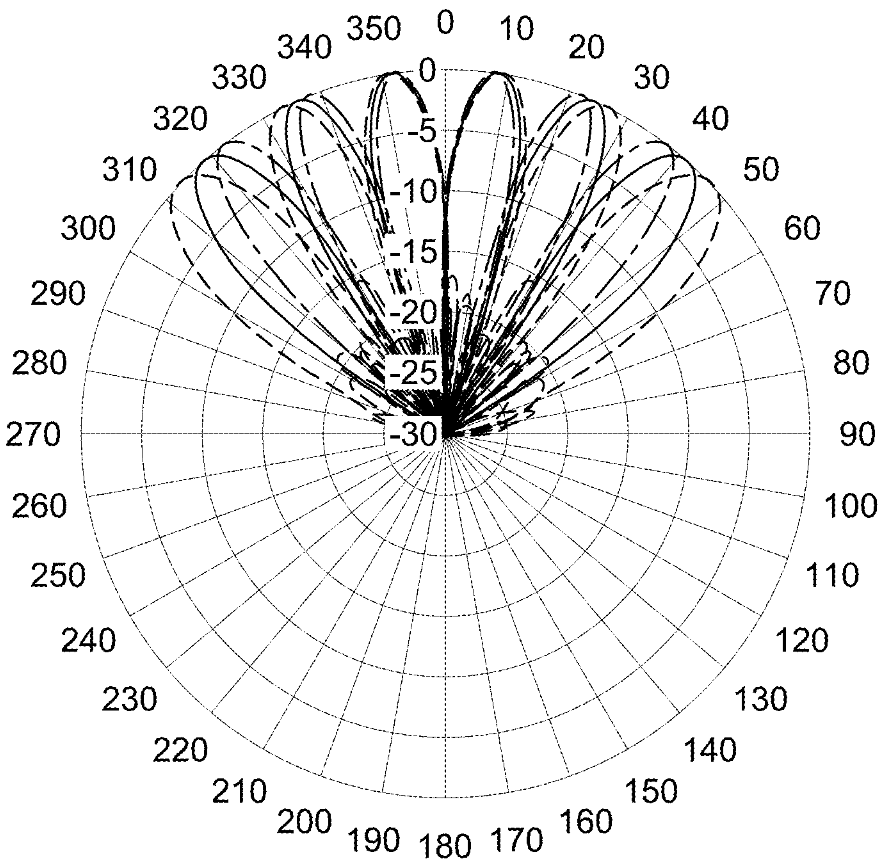
Figure 1C:
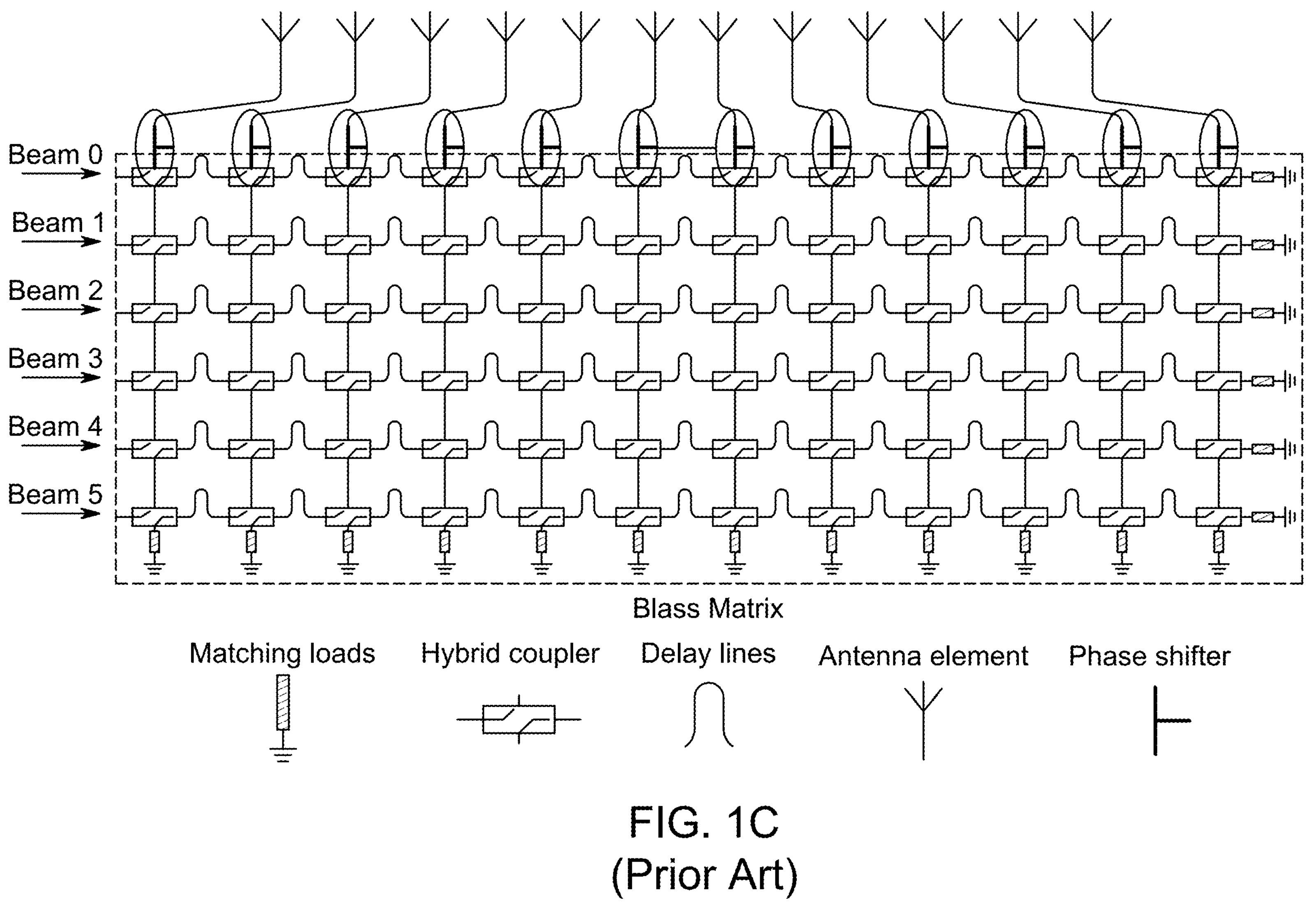
FIG. 1C, illustrates a prior art antenna system employing, a 6-input 12-output Blass matrix based beam forming network (BFN) for the six beam multibeam antenna for maintaining a fixed beam peak angle over a wide frequency range.
Figure 1D:
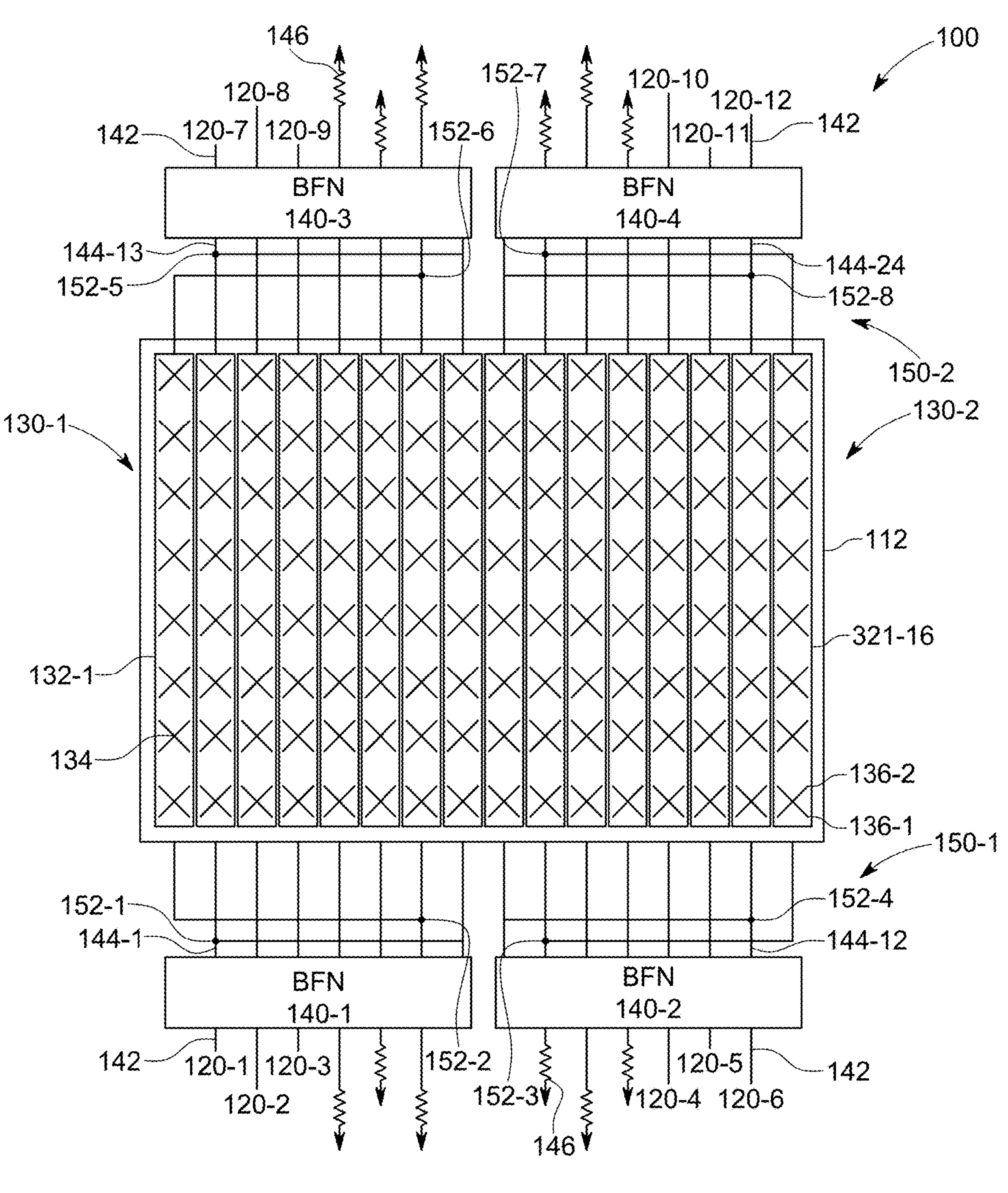
FIG. 1D, illustrates a prior art antenna system, employing a Butler matrix-based six beam multibeam antenna (2×2 MIMO) for maintaining a fixed beam peak angle over a wide frequency range.

In each subarray 112, 114, 116, 152, 154, and 156, fourteen outputs of AZBFNs elevation beam forming networks and (ELBFN) 124, 126, 128, 164, 166, 168 are integrated with the feeding networks of the patch antenna elements 118, 120, 122, 158, 160, 168; fourteen outputs of two azimuth beam forming network AZBFN 130, 132, 134, 170,172,174 (one for +45 polarization and one for −45 polarization) are connected to ELBFN 124, 126, 128, 164, 166,168 through the RF cables (not shown), six inputs of two AZBFN 130, 132, 134, 170,172,174 are connected to twenty-four triplexers 136, 176 (6 beams 4×4 MIMO) through the RF cables, and the common ports of triplexers 136, 176 are connected to ports 180 of the antenna 100. For simplicity, the cable connections between ELBFN and AZBFN, AZBFN and triplexers, and triplexers and the antenna ports are not shown in FIG. 3B. However, based on the block diagram shown in FIG. 1A and FIG. 2, it is straightforward to understand the cable connections between ELBFN and AZBFN within the multibeam sub-array and the cable connections between the beam ports of sub-arrays and triplexers.

Figure 1E:
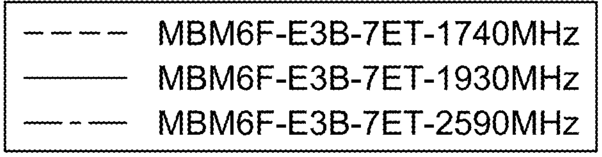
FIG. 1E, illustrates the beam pattern of a prior art antenna systems of FIGS. 1C and 1D, with the estimated azimuth and elevation patterns of 4×4 MIMO six beam antenna at the center frequency points of three sub-bands (i.e., 1740 MHz, 1930 MHz, and 2110 MHz).
Figure 1E:
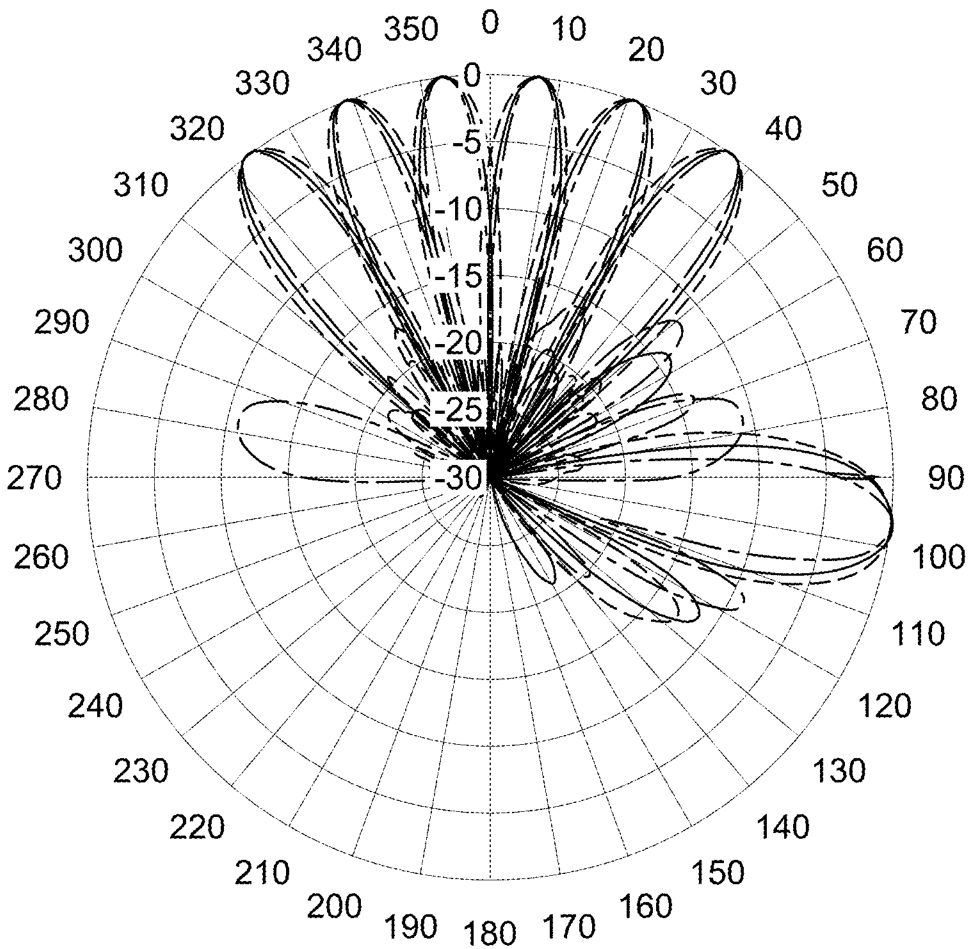
Figure 3C:
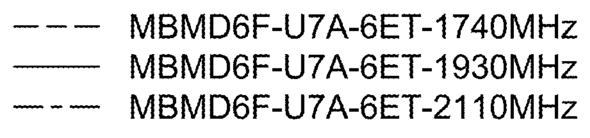
FIG. 3C illustrates the measured azimuth patterns of the 4×4 MIMO six beam antenna at the center frequency points of three sub-bands (i.e., 1740 MHz, 1930 MHz, and 2110 MHz) of FIG. 3A and FIG. 3B in accordance with one embodiment of the present invention.
Figure 3C:
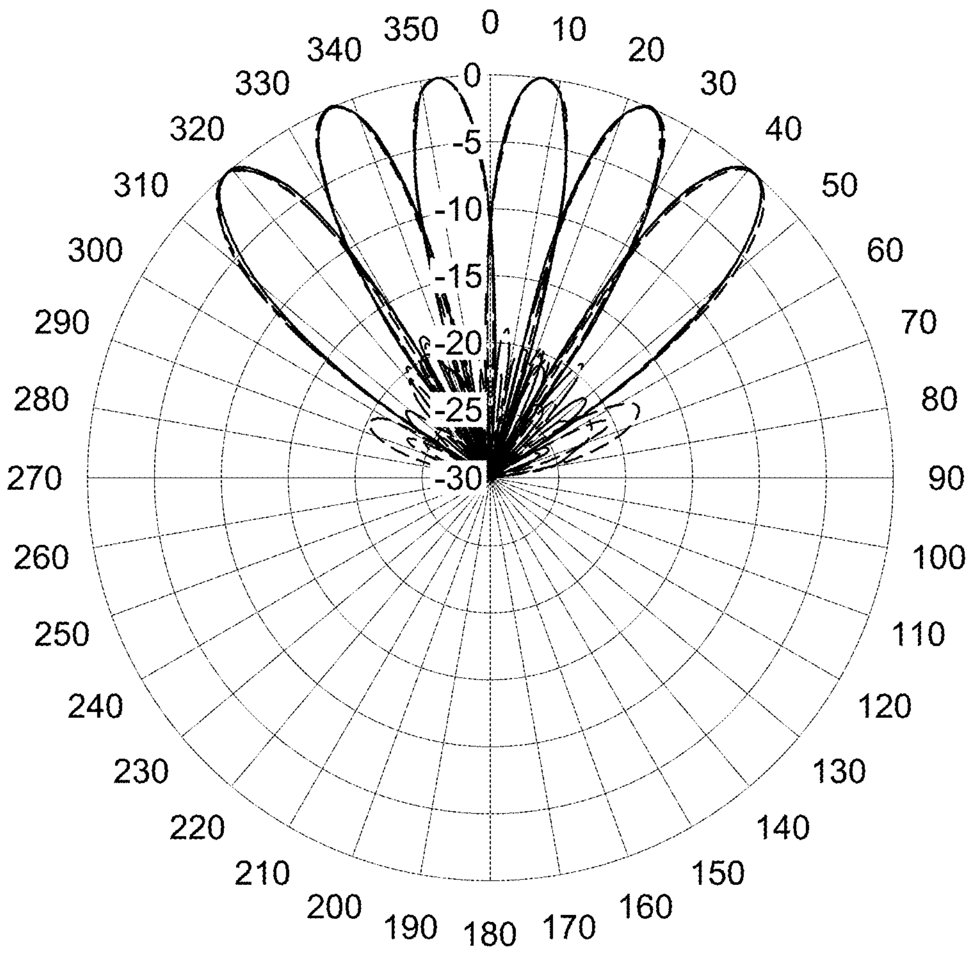
Figure 3D:
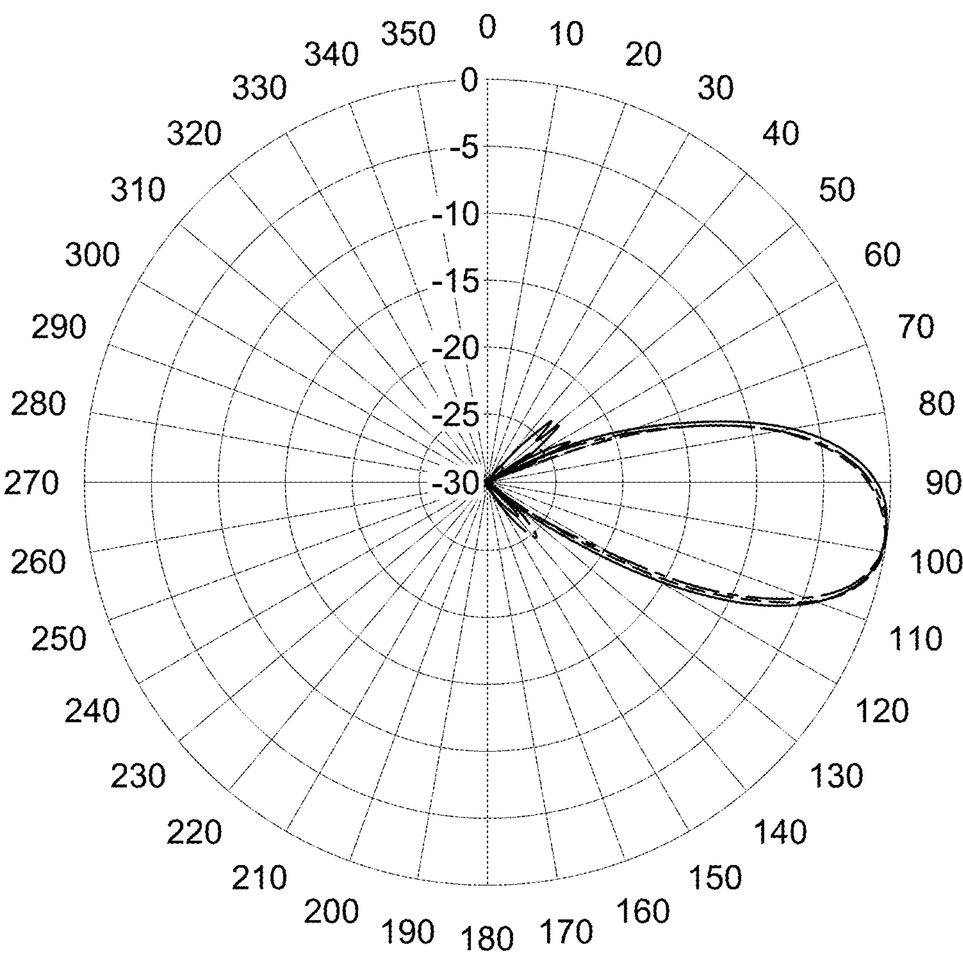
FIG. 3D illustrates the measured elevation patterns of the 4×4 MIMO six beam antenna at the center frequency points of three sub-bands (i.e., 1740 MHz, 1930 MHz, and 2110 MHz) of FIG. 3A and FIG. 3B in accordance with one embodiment of the present invention.

FIG. 3C and FIG. 3D show the measured azimuth and elevation patterns of 4×4 MIMO six beam antenna at the center frequency points of three sub-bands (i.e., $F_1$=1740 MHz, $F_2$=1930 MHz, and $F_3$=2110 MHz) of FIG. 3A and FIG. 3B. By comparing with FIG. 1E, in addition to the constant AZ beam peaks, the AZ beamwidths shown in FIG. 3C at 1740 MHz, 1930 MHz, and 2110 MHz are substantially same or constant, so are the AZ X-overs (i.e., 10 dB) between two neighbouring beams. On the other hand, in addition to the constant EL beam peaks, the EL beamwidths shown in FIG. 3D at 1740 MHz, 1930 MHz, and 2110 MHz are substantially same or constant too. So the multibeam antennas with constant AZ/EL peaks, constant AZ/EL BWs, and constant AZ X-overs over the frequency band of 1.69-2.4 GHz are achieved.

Figure 4A:
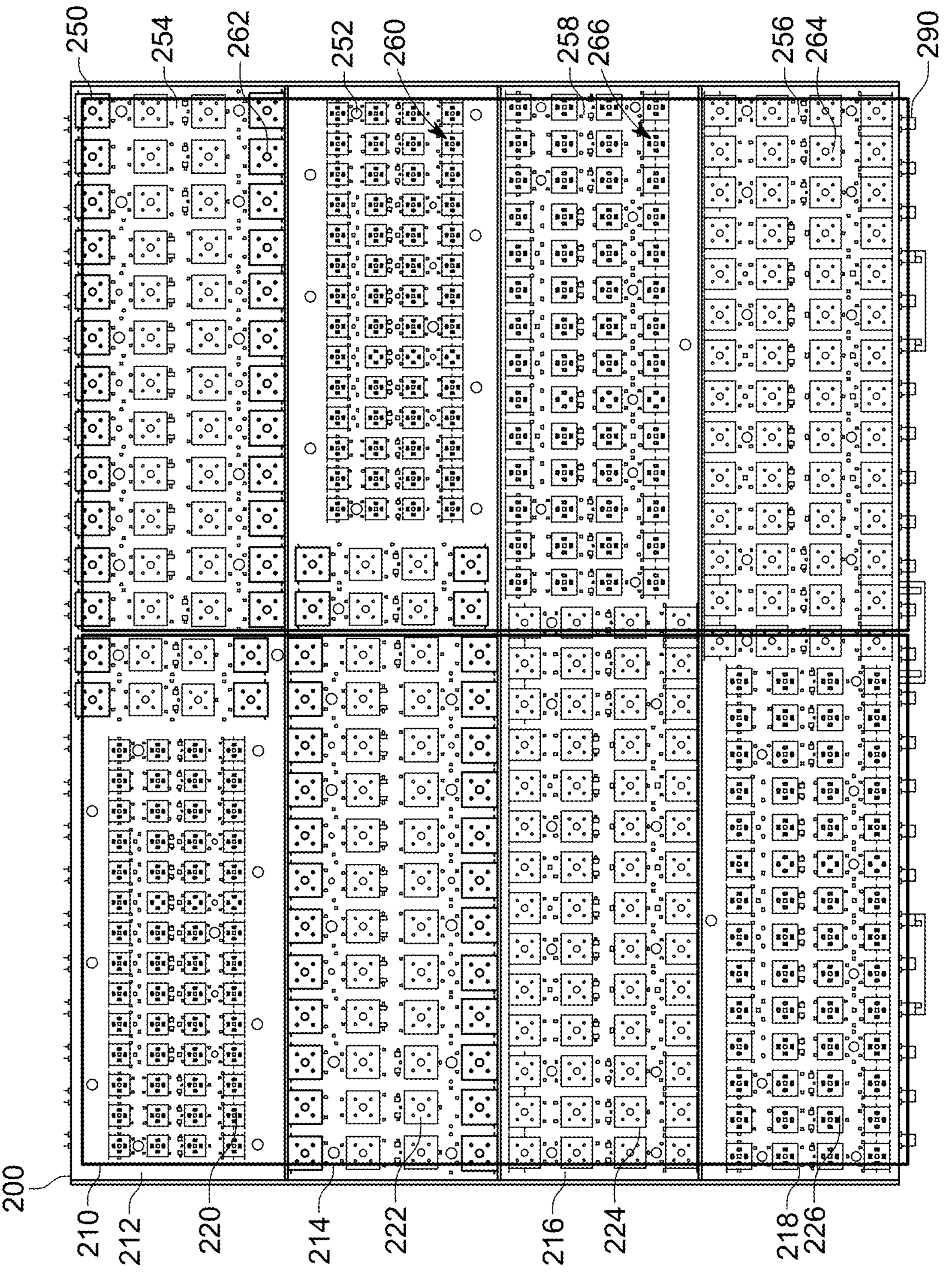
FIG. 4A, illustrates the front view of a 4×4 MIMO six beam antenna with four sub-bands according to another embodiment of the present invention.
Figure 4B:
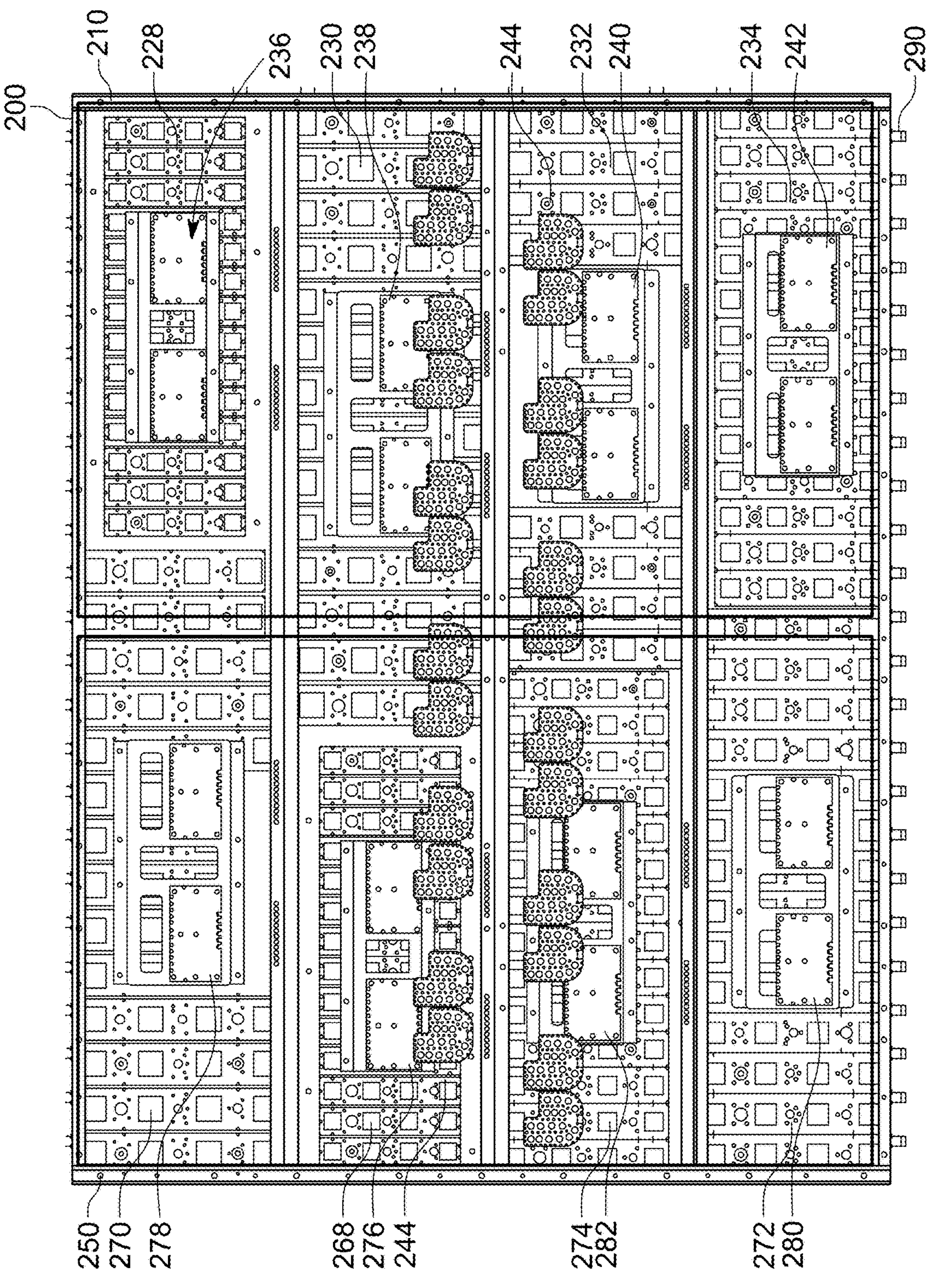
FIG. 4B, illustrates the bottom view of the 4×4 MIMO six beam antenna with four sub-bands of FIG. 4A.

In accordance with another embodiment, FIGS. 4A-4B show a six-beam base station antenna 200 for the ultra-wide middle band application (i.e., 1.69-2.69 GHz). FIG. 4A is a front view of a 24 port, dual-polarized 4×4 MIMO six-beam antenna 200 with eight sub arrays 212, 214, 216, 218,252, 254, 256, and 258. Four sub arrays 212, 214, 216, and 218 form the left half 210 of the six-beam antenna, and four sub arrays 252, 254, 256, and 258 form the right half 250 of the six-beam antenna for 2×2 MIMO application. Two 2×2 MIMO sections 210 and 250 are arranged side-by-side for 4×4 MIMO application. For the sub arrays 212, 214, 216, 218, 252, 254, 256, and 258, there are fourteen columns and 4 rows for realizing high gain six-beam, in which sub arrays 214 and 254 covers AWS UL band (1695-1780 MHz, i.e., $\Delta F_1$), sub arrays 216 and 156 covers PCS (1850-1995 MHz, i.e., $\Delta F_2$), sub arrays 218 and 258 covers AWS DL band (2110-2200 MHz, i.e., $\Delta F_3$), and sub arrays 212 and 252 covers BRS band (2496-2690 MHz, i.e., $\Delta F_4$). In each subarray 212, 214, 216, 218, 252, 254, 256, and 258, fifty-six patch elements 220, 222, 224, 226, 260, 262, 264, and 266 are arranged uniformly with fourteen columns and four rows. Based on the definition of FIG. 2B, for this embodiment, the antenna architecture with M=6 beams, L=4 arrays for each polarization, C=14 columns, R=4 rows, and quantity 24 quadplexers is used in the 4×4 MIMO 6 beam multibeam antenna.

FIG. 4B is a bottom view of the 24 port, dual-polarized 4×4 MIMO six-beam antenna 200 of FIG. 4A with two 2×2 MIMO section 210 and 250, in which there are four sub-arrays 212, 214, 216, 218, 252, 254, 256, and 258. In each subarray 212, 214, 216, 218, 252, 254, 256, and 258, fourteen ELBFN 228, 230, 232, 234, 268,270, 272, and 274 are integrated with the feeding networks of the patch antenna elements 220, 222, 224, 226, 260, 262, 264, and 266; fourteen outputs of two AZBFN 236, 238, 240, 242, 276, 278, 280, and 282 (one for +45 polarization and one for −45 polarization) are connected to ELBFN 228, 230, 232, 234, 268,270, 272, and 274 through the RF cables, six inputs of two AZBFN 236, 238, 240, 242, 276, 278, 280, and 282 are connected to twenty-four quadplexers 244, 284 through the RF cables, and the common ports of quadplexers 244, 284 are connected to ports 290 of the antenna 200. Again, the cable connections between ELBFN and AZBFN, AZBFN and quadplexers, and quadplexers and the antenna ports are not shown in FIG. 3B. However, based on the block diagram shown in FIG. 1A and FIG. 2, it is straightforward to understand the cable connections between ELBFN and AZBFN within the multibeam sub-array and the cable connections between the beam ports of sub-arrays and quadplexers.

Figure 4C:
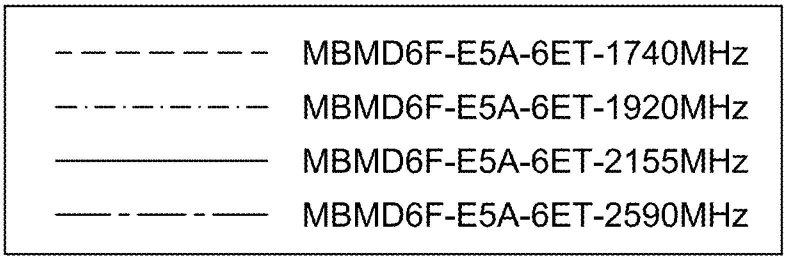
FIG. 4C, illustrates the measured azimuth patterns of the 4×4 MIMO six beam antenna at the center frequency points of the four operating sub-bands (i.e., 1740 MHz, 1920 MHz, 2155 MHz, and 2590 MHz) of FIG. 4A and FIG. 4B.
Figure 4C:
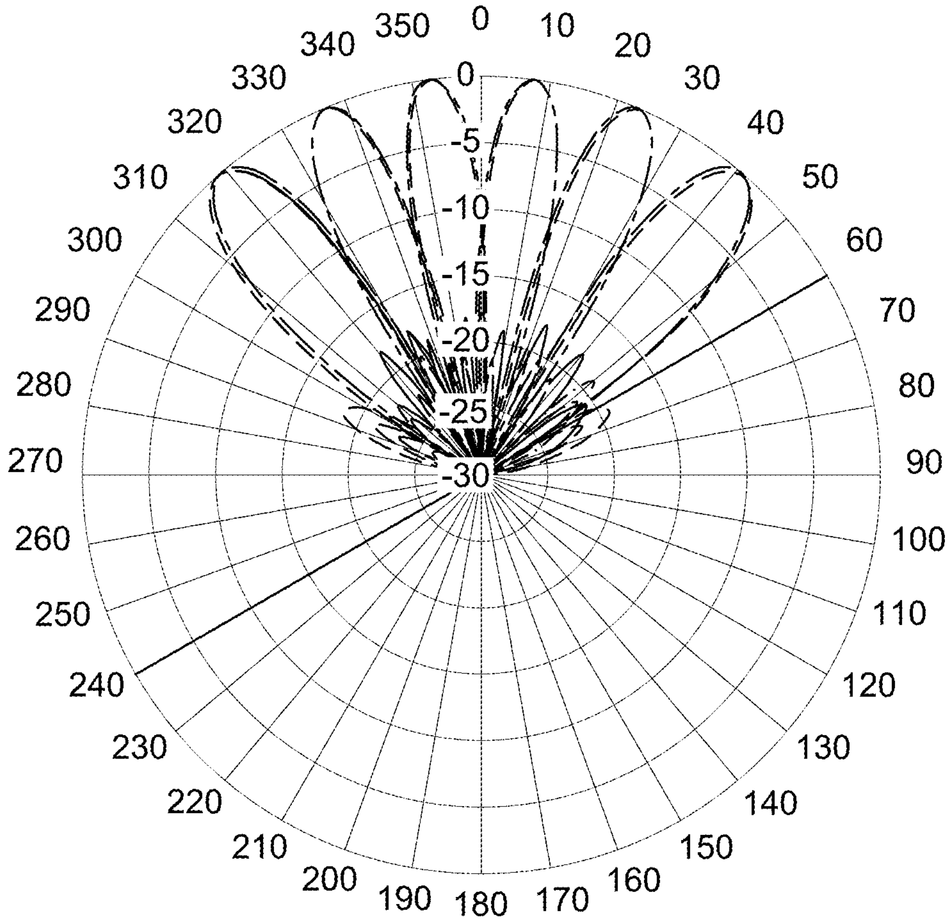
Figure 4D:
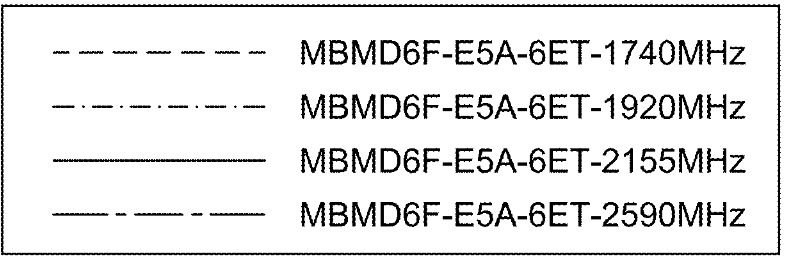
FIG. 4D, illustrates the measured elevation patterns of the 4×4 MIMO six beam antenna at the center frequency points of the four sub-bands (i.e., 1740 MHz, 1920 MHz, 2155 MHz, and 2590 MHz) of FIG. 4A and FIG. 4B.
Figure 4D:
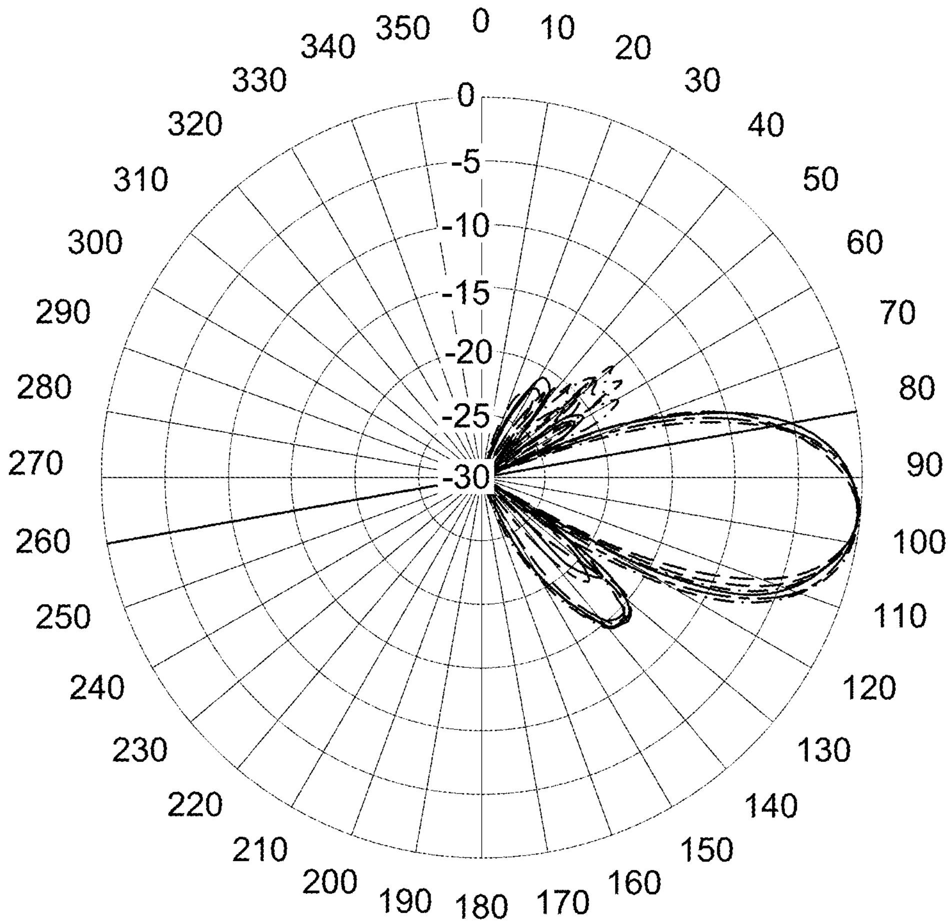

FIG. 4C and FIG. 4D show the measured azimuth and elevation patterns of 4×4 MIMO six beam antenna at the center frequency points of four sub-bands (i.e., $F_1$=1740 MHz, $F_2$=1920 MHz, $F_3$=2115 MHz, and $F_4$=2590 MHz) of FIG. 4A and FIG. 4B. By comparing with FIG. 1E, in addition to the constant AZ beam peaks, the AZ beamwidths shown in FIG. 4C at 1740 MHz, 1920 MHz, 2155 MHz, and 2590 MHz are substantially same or constant, so are the AZ X-overs (i.e., 10 dB) between two neighbouring beams. On the other hand, in addition to the constant EL beam peaks, the EL beamwidths shown in FIG. 4D at 1740 MHz, 1920 MHz, 2155 MHz, and 2590 MHz are substantially same or constant too. So the multibeam antennas with constant AZ/EL peaks, constant AZ/EL BWs, and constant AZ X-overs over the frequency band of 1.69-2.69 GHz are achieved.

For typical 5G systems with two sub-bands such as 3500 band (3450-3550 MHz i.e., $\Delta F_1$) and 3850 band (3700-4000 MHz i.e., $\Delta F_2$), the required multibeam antennas with the constant beam peaks, the constant azimuth beam widths, and constant elevation beam widths over the frequency band can be realized through diplexers (i.e., L=2).

Figure 5A:
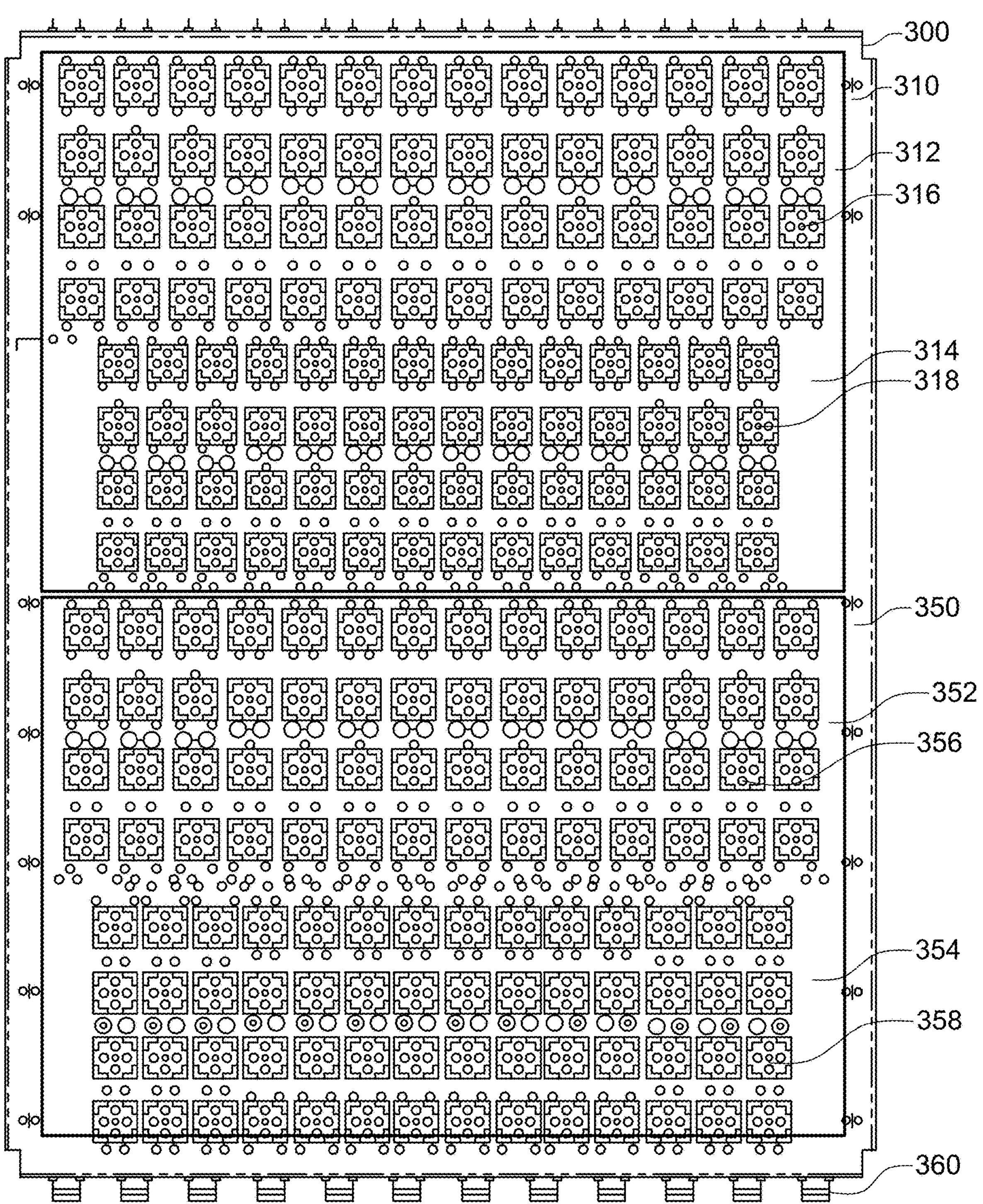
FIG. 5A, illustrates the front view of a 4×4 MIMO six beam antenna with two high sub-bands according to another embodiment of the present invention.

In accordance with another embodiment, FIG. 5A illustrates the front view of a 24 port, dual-polarized 4×4 MIMO six-beam antenna 300 with four sub arrays 312, 314, 352, and 354 for the high band application (i.e., 3.3-4.0 GHz). Two sub arrays 312 and 314 form the top half 310 of the six-beam antenna and two sub arrays 252, 254 form the bottom half 350 of the six-beam antenna for 2×2 MIMO application. Two 2×2 MIMO sections 310 and 350 are stacked vertically for 4×4 MIMO application. For the sub arrays 312, 314, 352, and 354, there are fourteen columns and four rows for realizing high gain six-beam, in which sub arrays 312 and 352 covers 3500 band (3450-3550 MHz), and sub arrays 314 and 354 covers 3850 band (3700-4000 MHz). In each subarray 312, 314, 352, and 354, fifty-six patch elements 316, 318, 356, 358 are arranged uniformly with fourteen columns and four rows. Based on the definition of FIG. 2B, for this embodiment, the antenna architecture with M=6 beams, L=2 arrays, C=14 columns, R=4 rows, and quantity 24 diplexers is used in the 4×4 MIMO 6 beam multibeam antenna.

Furthermore, for the antenna shown in FIG. 5A, if only seven columns with 3-beam AZBFNs (i.e., three inputs and seven outputs) then twelve diplexers are used to replace the original fourteen columns with 6-beam AZBFNs (i.e., six inputs and fourteen outputs) and the original twenty-four diplexers, resulting in a 12 port dual-polarized 4×4 MIMO three-beam antenna. Based on the definition of FIG. 2B, for a three beam pattern in accordance with this embodiment M=3 beams, L=2 arrays, C=7 columns, R=4 rows, and quantity 12 diplexers are used in the 4×4 MIMO 3 beam multibeam antenna.

Figure 5B:
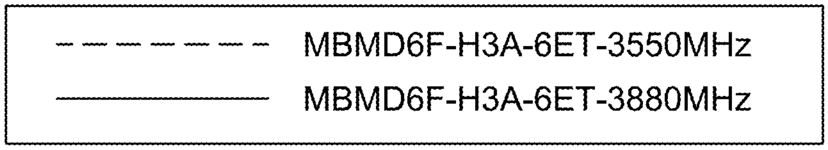
FIG. 5B, illustrates the measured azimuth and elevation patterns of the 4×4 MIMO six beam antenna at the center frequency points of the two sub-bands (i.e., 3500 MHz and 3850 MHz) of FIG. 5A with 14 columns.
Figure 5B:
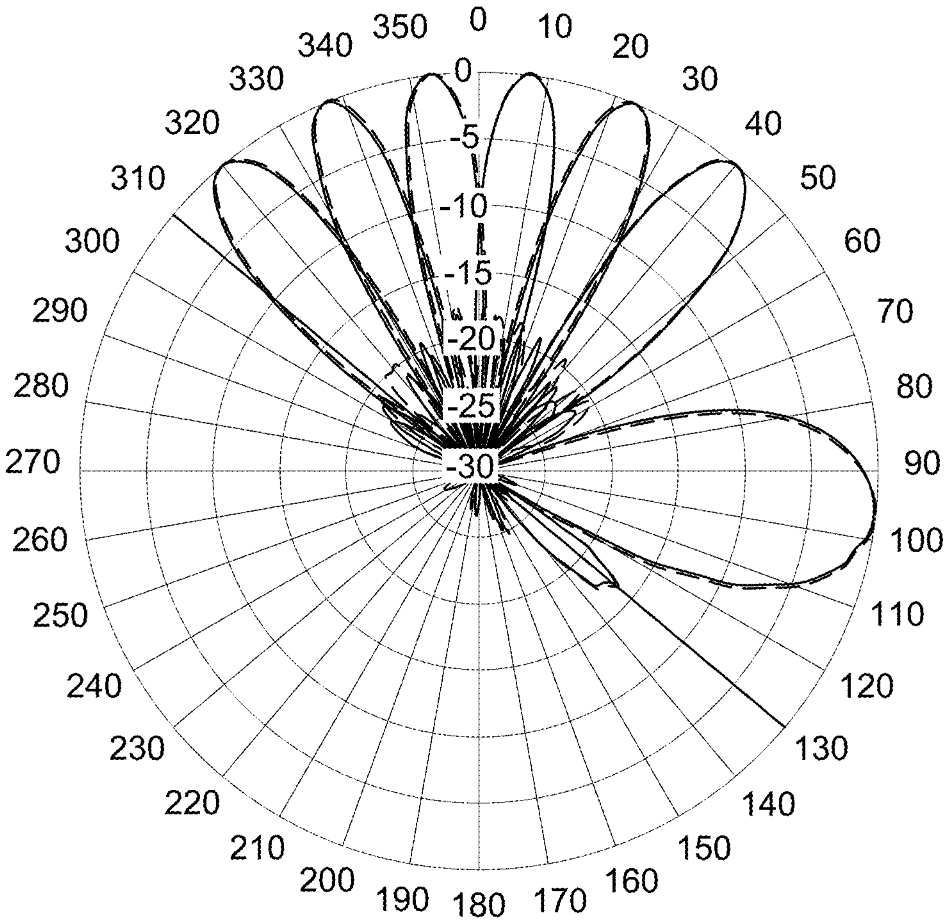

FIG. 5B shows the measured azimuth and elevation patterns of 4×4 MIMO six-beam antenna at the center frequency points of two sub-bands (i.e., $F_1$=3500 MHz and $F_2$=3880 MHz) of FIG. 5A. By comparing with FIG. 1E, in addition to the constant AZ beam peaks, the AZ BWs shown in FIG. 5B at 3500 MHz and 3880 MHz are substantially same or constant, so are the AZ X-overs (i.e., 10 dB) between two neighbouring beams. On the other hand, in addition to the constant EL beam peaks, the EL BWs shown in FIG. 5B at 3500 MHz and 3880 MHz are substantially same or constant too. So the six beam multibeam antennas with constant AZ/EL peaks, constant AZ/EL BWs, and constant AZ X-overs over the frequency band of 3.3-4.0 GHz are achieved.

Figure 5C:
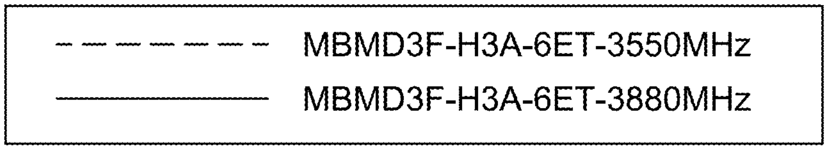
FIG. 5C, illustrates the measured azimuth and elevation patterns of the 4×4 MIMO, modified as a three beam antenna at the center frequency points of two sub-bands (i.e., 3500 MHz and 3850 MHz) of FIG. 5A with 7 columns, instead of 14 columns.
Figure 5C:
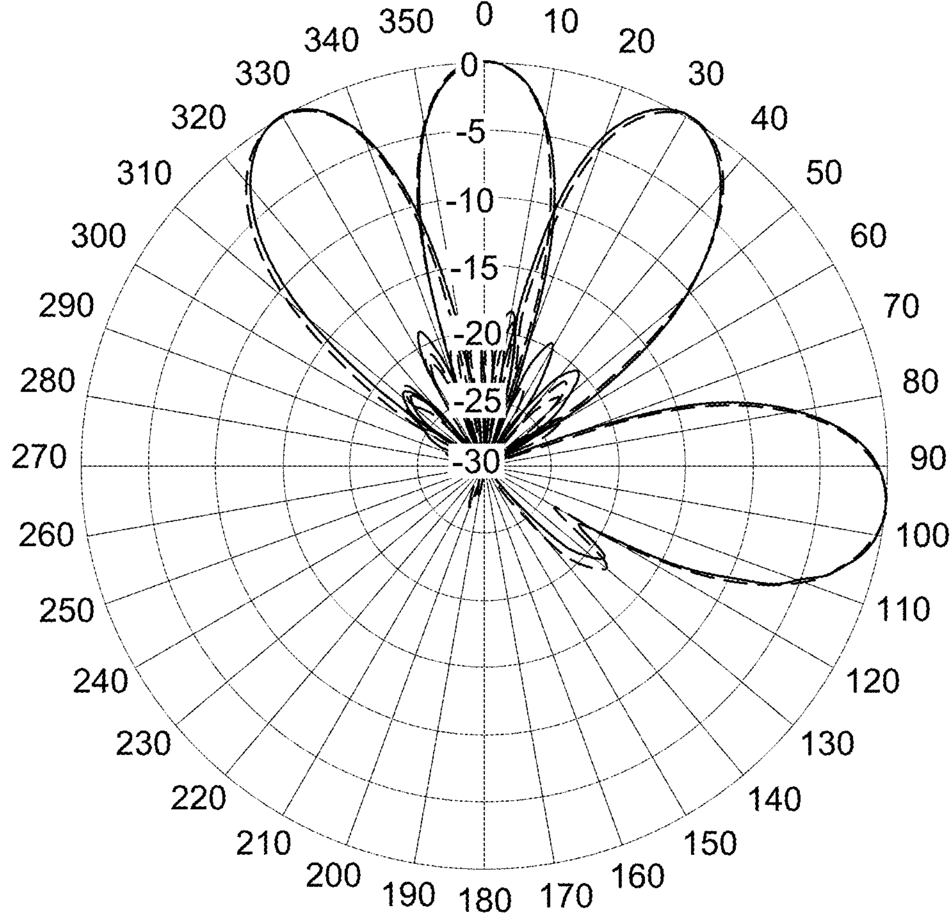

FIG. 5C show the measured azimuth and elevation patterns of 4×4 MIMO three-beam antenna at the center frequency points of two sub-bands (i.e., $F_1$=3500 MHz and $F_2$=3880 MHz) of FIG. 5A, where only seven columns are utilized (i.e., L=20. By comparing with FIG. 1E, in addition to the substantially constant AZ beam peaks, the AZ BWs shown in FIG. 5C at 3500 MHz and 3880 MHz are substantially same or constant, so are the AZ X-overs (i.e., 10 dB) between two neighbouring beams. On the other hand, in addition to the constant EL beam peaks, the EL BWs shown in FIG. 5C at 3500 MHz and 3880 MHz are substantially same or constant too. So the three beam multibeam antennas with constant AZ/EL peaks, constant AZ/EL BWs, and constant AZ X-overs over the frequency band of 3.3-4.0 GHz are achieved.

In accordance with yet another embodiment, the multiplexing approach can be used for dual band and triband multibeam antennas, in which the operating frequency of the antenna belongs to two or three wireless bands (i. e., Low band (LB): 698-960 MHz, Middle band (MB): 1695-2690 MHz, and High band (HB): 3300-4200 MHz). For example, for the frequency of the dual band multibeam antenna covers LB and three sub-band MB such as AWS UL (1695-1780 MHz, i.e., $\Delta F_1$), PCS (1850-1995 MHz, i.e., $\Delta F_2$), and AWS DL & WCS (2110-2360 MHz, i.e., $\Delta F_3$), the required multibeam antennas with the constant beam peaks, the constant azimuth beam widths, and constant elevation beam widths over the frequency band at MB can be realized through triplexers.

Figure 6A:
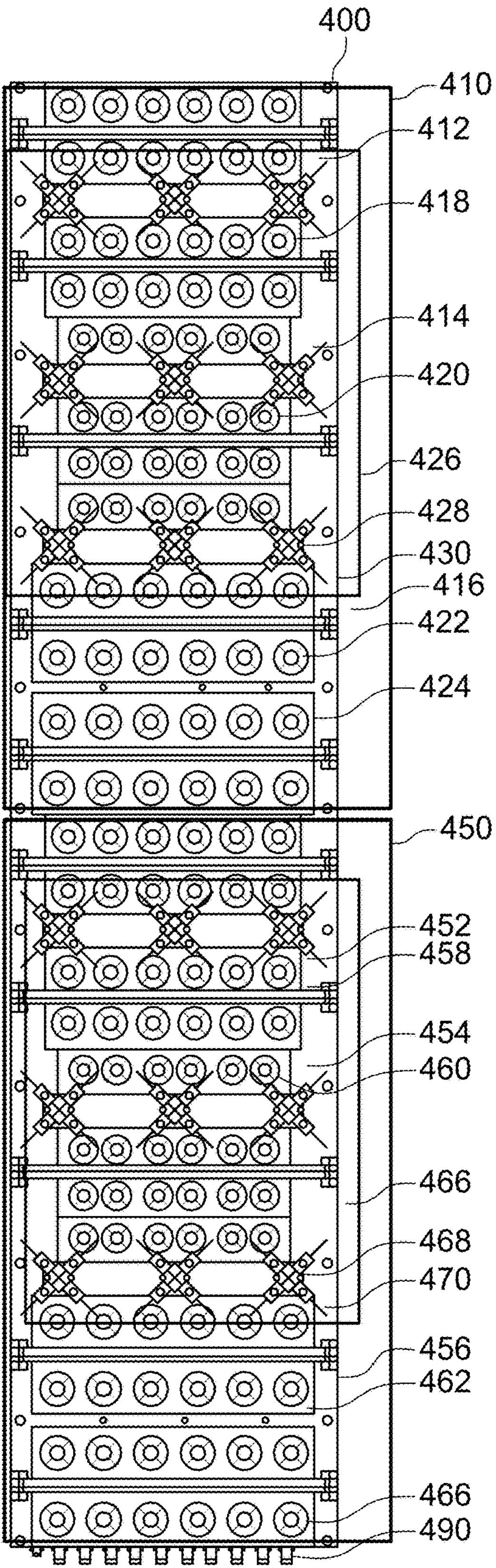
FIG. 6A, illustrates the front view of 4×4 MIMO five beam antenna with two low band beams and three middle sub-band beams according to another embodiment of the present invention.
Figure 6B:
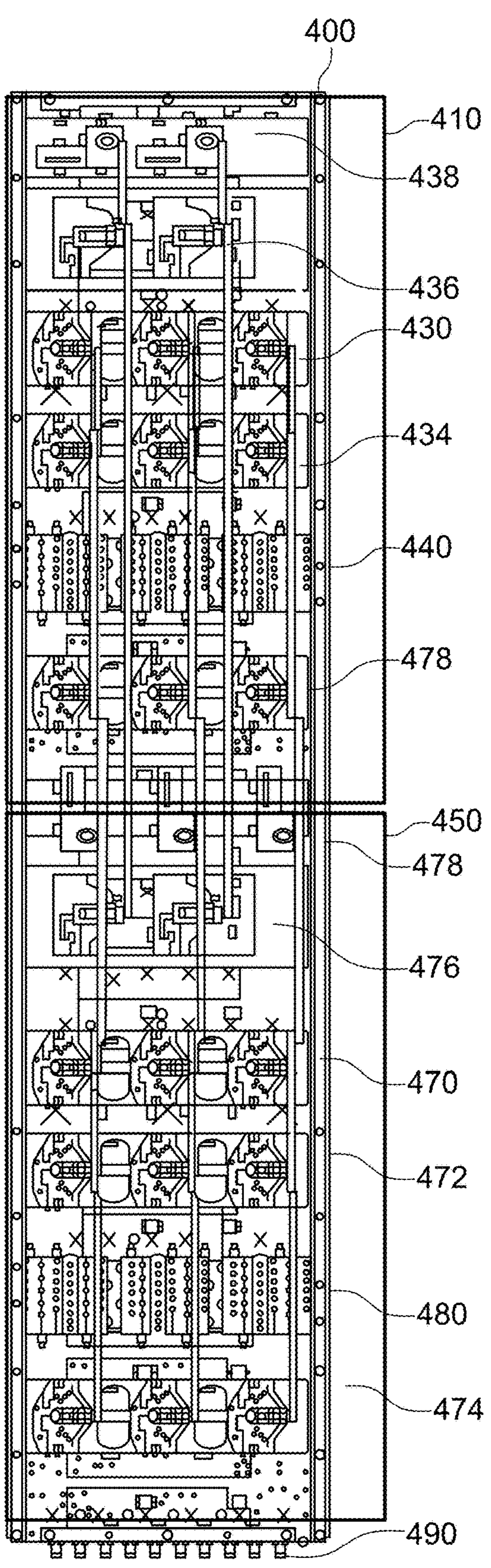
FIG. 6B, illustrates the bottom view of 4×4 MIMO five beam antenna with two low band beams and three middle sub-band beams of FIG. 6A.

FIGS. 6A-6B show a multibeam base station antenna 400 for the low band two-beam and middle band three-beam application, which is called the three/two-beam antenna. FIG. 6A shows the front view of a 20 port, dual-polarized 4×4 MIMO three/two-beam antenna 400 with three sub-bands at MB and one sub-band at LB. The antenna 400 consists of six MB sub arrays 412, 414, 416, 452, 454, and 456 and two LB sub arrays 426 and 466. Three MB sub arrays 412, 414, 416 and one LB sub array 426 form the top half 410 of the three/two-beam antenna and three MB sub arrays 452, 454, 456 form the bottom half 450 of the three/two-beam antenna for 2×2 MIMO application. Two 2×2 MIMO sections 410 and 450 are stacked vertically for 4×4 MIMO application. For the LB sub arrays 426 and 466 interleaved with MB sub arrays, there are three columns and three rows for realizing high gain two-beam pattern.

For the MB sub arrays 412, 414, 416, 452, 454, and 456, there are six columns and 4 rows for realizing high gain three-beam pattern, in which sub arrays 412 and 452 covers AWS UL band (i.e., $\Delta F_1$=1695-1780 MHz), sub arrays 414 and 454 covers PCS (i.e., $\Delta F_2$=1850-1995 MHz), and sub arrays 416 and 456 covers AWS DL & WCS band (i.e., $\Delta F_3$=2110-2360 MHz). In each MB subarray 416 and 456, twenty-four dipole elements 424 and 464 are arranged uniformly with six columns and four rows.

However, for MB subarray 412 and 452, to minimize the impact of LB antenna elements 430 and 470, twenty-four dipole elements 424 and 464 are arranged uniformly with six columns and non-uniformly with four rows. Furthermore, for MB subarray 414 and 454, to integrate AZBFN with the feeding network of MB elements 424 and 464, twenty-four dipole elements 424 and 464 are arranged non-uniformly with six columns and four rows. Based on the definition of FIG. 2B, for this embodiment, the antenna architecture at the middle band with M=3 beams, L=3 arrays, C=6 columns, R=4 rows, and quantity 12 triplexers is used in the 4×4 MIMO 3 beam multibeam antenna over the frequency band of 1695-2400 MHz.

FIG. 6B is a bottom view of a 20 port, dual-polarized 4×4 MIMO six-beam antenna 400 with two 2×2 MIMO section 410 and 450, in which there are three MB sub-arrays 112, 114, 116, 152, 154, and 156 and one LB sub-arrays 426 and 466. In each MB subarray 412, 414, 416, 452, 454, and 456, four AZBFN 418, 420, 422, 458,460,462 are integrated with the feeding networks of the dipole antenna elements 424 and 464; four outputs of six ELBFN 430, 432, 434, 470,472,474 (three for +45 polarization and three for −45 polarization) are connected to AZBFN 418, 420, 422, 458, 460, 462 through the RF cables, six inputs of six ELBFN 430, 432, 434, 470,472,474 are connected to twelve triplexers 440, 480 through the RF cables, and the common ports of triplexers 440, 480 are connected to ports 490 of the antenna 400. In each LB subarray 426 and 466, three AZBFN 428 and 468 are integrated with the feeding networks of the dipole antenna elements 430 and 470; three outputs of four ELBFN 436 and 476 (two for +45 polarization and two for −45 polarization) are connected to AZBFN 428 and 468 through the RF cables, four inputs of four ELBFN 436 and 476 are connected to ports 490 of the antenna 400. It is worth noting that, for the RET application at both LB and MB, ELBFNs at LB and MB are realized by low passive inter-modulation (PIM) phase shifters driven by RET motor 438 and 478. Again, the cable connections between ELBFN and AZBFN, AZBFN and triplexers, and triplexers and the antenna ports are not shown in FIG. 6B. However, based on the block diagram shown in FIG. 1A and FIG. 2B, it is straightforward to understand the cable connections between ELBFN and AZBFN within the multibeam sub-array and the cable connections between the beam ports of sub-arrays and triplexers.

Figure 6C:
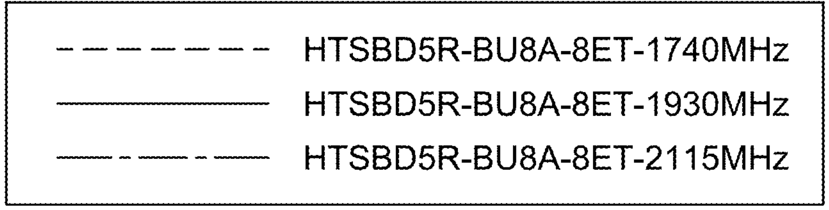
FIG. 6C, illustrates the measured azimuth patterns of 4×4 MIMO five beam antenna at the center frequency points of three middle sub-bands (i.e., 1740 MHz, 1930 MHz, and 2155 MHz) of FIG. 6A and FIG. 6B. The two beam lower band pattern is not shown.
Figure 6C:
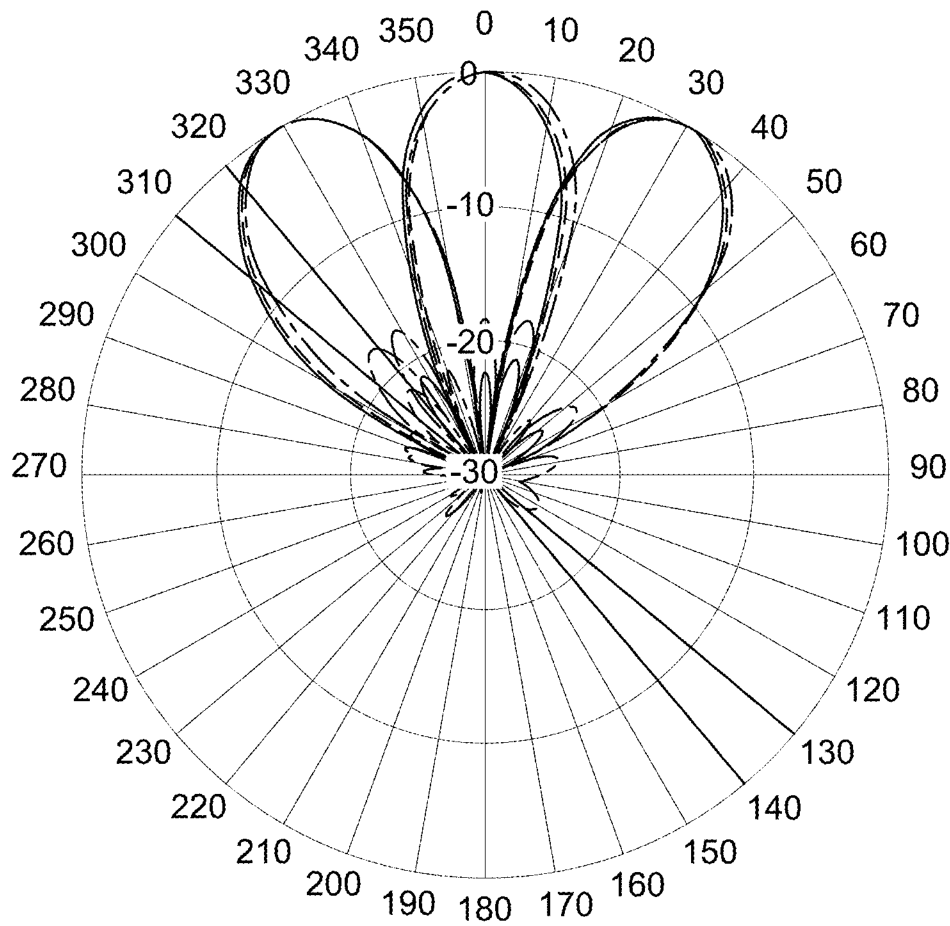
Figure 6D:
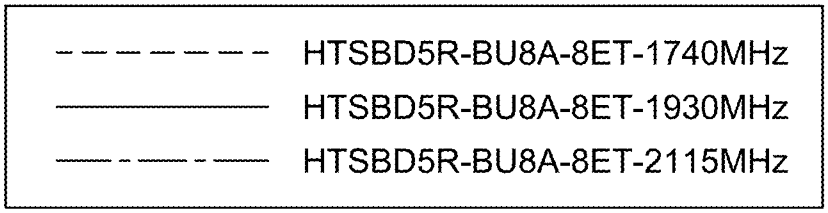
FIG. 6D, illustrates the measured elevation patterns of 4×4 MIMO five beam antenna at the center frequency points of three middle sub-bands (i.e., 1740 MHz, 1930 MHz, and 2155 MHz) of FIG. 6A and FIG. 6B.
Figure 6D:
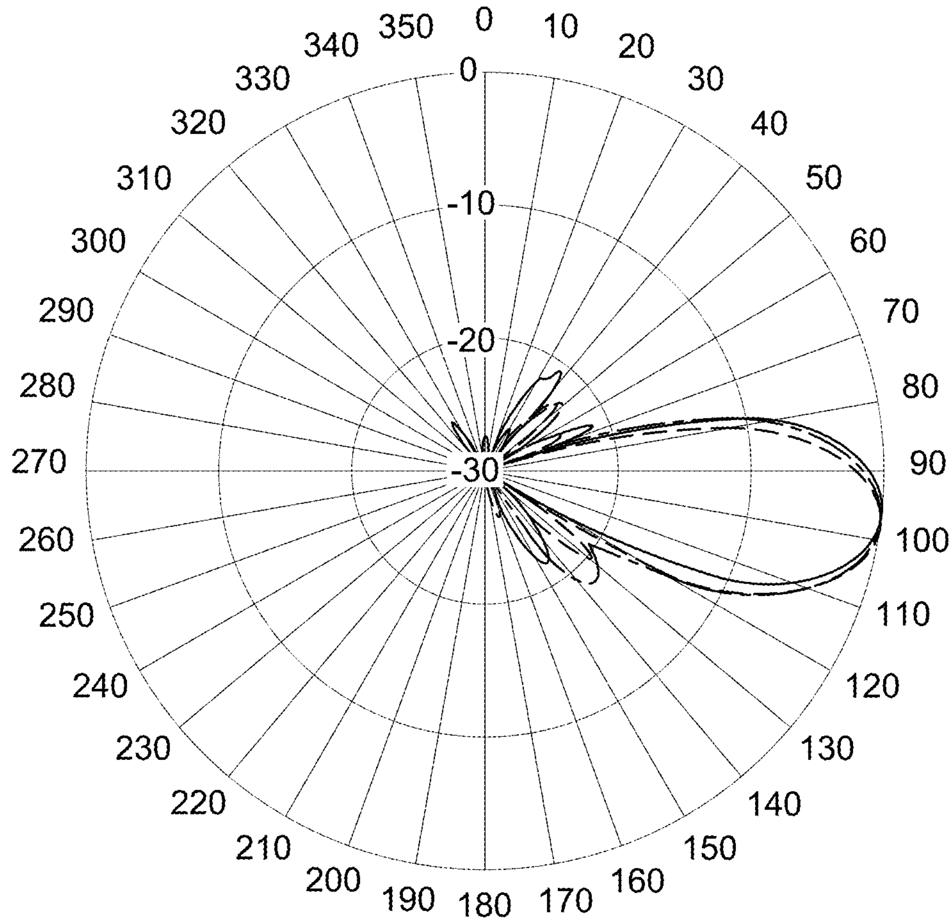

FIG. 6C and FIG. 6D show the measured azimuth and elevation patterns of 4×4 MIMO three beam antenna at the center frequency points of three sub-bands (i.e., $F_1$=1740 MHz, $F_2$=1930 MHz, and $F_3$=2110 MHz) of FIG. 6A and FIG. 6B. By comparing with FIG. 1E, in addition to the constant AZ beam peaks, the AZ BWs shown in FIG. 6C at 1740 MHz, 1930 MHz, and 2110 MHz are substantially same or constant, so are the AZ X-overs (i.e., 7 dB) between two neighbouring beams. On the other hand, in addition to the constant EL beam peaks, the EL BWs shown in FIG. 6D at 1740 MHz, 1930 MHz, and 2110 MHz are same or constant too. So the three beam antennas with constant AZ/EL peaks, constant AZ/EL BWs, and constant AZ X-overs over the frequency band of 1.69-2.4 GHz are achieved.

Applicants note that with all embodiments of FIGS. 3A, 4A, 5A, and 6A, depending on the gain and coverage requirement, the basic structures can be extended to any number of columns and any number of rows. For example, the fourteen column six-beam subarray can be changed to seven column sub-array for three-beam, ten column sub-array for four-beam or five beam, and twenty column sub-array for nine beam or ten beam. The following table shows the relationship among the array columns, the typical beam numbers, Butler matrix N×N or (N−1)×N, and AZ X-over (dB):

| Beam # | Column # C | Butler matrix # N | AZ X-over, dB |
|---|---|---|---|
| 2 | 3 | 2 × 2 | 7-8 |
| 2 | 4 | 2 × 2 | 10-12 |
| 3 | 6 | 3 × 4 | 7-8 |
| 3 | 7 | 3 × 4 | 10-11 |
| 5 | 10 | 6 × 6 | 10-11 |
| 6 | 14 | 8 × 8 | 10-11 |
| 9 | 20 | 12 × 12 | 10-11 |

While only certain features of the invention have been illustrated and described herein, many modifications, substitutions, changes or equivalents will now occur to those skilled in the art. It is therefore it is understood that this application is intended to cover all such modifications and changes that fall within the true spirit of the invention.

The invention claimed is:

1. A multibeam antenna operating over a plurality of frequency bands comprising:

a plurality of planar multibeam arrays, each array corresponding to an operating frequency band $\Delta F_i$ within said plurality of said frequency bands, each array having a plurality of antenna elements for transmitting and receiving signals wherein distances between said antenna elements on each of said arrays is arranged as a function of a center frequency $f_i$ of said operating frequency band; and a plurality of multiplexers, each coupled to beam ports of said plurality of planar multibeam arrays, each of said plurality of multiplexers has a common beam port for sending and receiving said signals through said antenna elements, wherein beam peaks and beam widths of said multibeam antenna remain substantially the same across said plurality of frequency bands.

2. The multibeam antenna in accordance with claim 1, wherein the array azimuth spacing $d_i$ for each of said planar multibeam arrays i is governed by equation:

$$d_i = C\lambda_i,\ i = 1, 2, \ldots, L$$

where C is a constant value, and $\lambda_i=c/f_i$, $f_i$ (i=1, 2, . . . , L) is wavelength of center frequency point of the corresponding operating frequency band $\Delta F_i$.

3. The multibeam antenna of claim 2, wherein two multibeam arrays of said antennas operating at two frequency sub-bands of a frequency band, are coupled to a plurality of diplexers.

4. The multibeam antenna of claim 3, wherein the number of said diplexers is a function of the number of signal beams for each multibeam array of said frequency sub-bands.

5. The multibeam antenna of claim 4, wherein the number of said diplexers is equal to n×M, where M is the number of beams of said signal beams and n is the number of multiple-input, multiple output of said multibeam antenna.

6. The multibeam antenna of claim 5 wherein the number of said diplexers is 4×M for a 4×4 MIMO multibeam antenna and is 2×M for a 2×2 MIMO Multibeam antenna.

7. The multibeam antenna of claim 2, wherein three multibeam arrays of said antenna operating at three frequency sub-bands of a frequency band, are coupled to a plurality of triplexers.

8. The multibeam antenna of claim 7, wherein the number of said triplexers is a function of the signal beams for each multibeam array of said frequency sub-bands.

9. The multibeam antenna of claim 8, wherein the number of said triplexers is equal to n×M where M is the number of beams of said signal beams and n is the number of multiple-input, multiple output of said multibeam antenna.

10. The multibeam antenna of claim 9 wherein the number of said triplexers is 4×M for a 4×4 MIMO multibeam antenna and is 2×M for a 2×2 MIMO multibeam antenna.

11. The multibeam antenna of claim 2, wherein four multibeam arrays of said antennas operating at four frequency sub-bands of a frequency band, are coupled to a plurality of quadplexers.

12. The multibeam antenna of claim 11, wherein the number of said quadplexers is a function of the number of signal beams for each multibeam array of said frequency sub-bands.

13. The multibeam antenna of claim 12, wherein the number of said quadplexers is equal to n×M, where M is the number of beams of said azimuth signal beams and n is the number of multiple-input, multiple output of said multibeam antenna.

14. The multibeam antenna of claim 13 wherein the number of said quadplexers is 4×M for a 4×4 MIMO multibeam antenna and is 2×M for a 2×2 MIMO Multibeam antenna.

* * * * *